(12) United States Patent
Kishigami

(10) Patent No.: US 10,732,272 B2
(45) Date of Patent: Aug. 4, 2020

(54) RADAR APPARATUS AND RADAR METHOD

(71) Applicant: Panasonic Corporation, Osaka (JP)

(72) Inventor: Takaaki Kishigami, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 332 days.

(21) Appl. No.: 15/913,969

(22) Filed: Mar. 7, 2018

(65) Prior Publication Data

US 2018/0267158 A1 Sep. 20, 2018

(30) Foreign Application Priority Data

Mar. 14, 2017 (JP) .................................. 2017-048889

(51) Int. Cl.
*G01S 13/28* (2006.01)
*G01S 13/04* (2006.01)
(Continued)

(52) U.S. Cl.
CPC ............ *G01S 13/284* (2013.01); *G01D 5/249* (2013.01); *G01S 13/04* (2013.01); *G08C 19/28* (2013.01)

(58) Field of Classification Search
CPC ...... G01D 5/249; G08C 19/28; G01S 13/284; G01S 13/04; G01S 13/288; G01S 13/89
See application file for complete search history.

(56) References Cited

U.S. PATENT DOCUMENTS 4,821,038 A * 4/1989 Enge .................. G01S 1/24
342/389
2013/0234803 A1* 9/2013 Hansen .................... H03K 7/00
332/144

(Continued)

FOREIGN PATENT DOCUMENTS

JP 2013-185945 9/2013

OTHER PUBLICATIONS

S. Z. Budisin, "New complementary pairs of sequences", Electronics Letters, vol. 26, No. 13, Jun. 21, 1990, pp. 881-883.

(Continued)

*Primary Examiner* — Vladimir Magloire
*Assistant Examiner* — Donald H B Braswell
(74) *Attorney, Agent, or Firm* — Seed IP Law Group LLP

(57) ABSTRACT

A radar apparatus includes: a radar transmitter transmitting a radar signal; and a radar receiver receiving a reflection wave signal being a reflection of the radar signal on a target. The radar transmitter includes: a radar transmission signal generator that generates the radar signal composed of a transmission code with each sub-pulse given a predetermined phase shift; and a transmission radio unit that transmits the radar signal generated by the radar transmission signal generator in a predetermined transmission cycle. In radar signals transmitted by the transmission radio unit in a predetermined number of transmission cycles, code imbalances of transmission codes are included in all of four quadrants of the IQ plane. Each of the code imbalances is an imbalance between the positions where a plurality of sub-pulses constituting a transmission code included in a radar signal transmitted in each of the transmission cycles are mapped on the IQ plane.

8 Claims, 12 Drawing Sheets

(51) Int. Cl.
    *G01D 5/249*     (2006.01)
    *G08C 19/28*     (2006.01)

(56) References Cited

U.S. PATENT DOCUMENTS

2015/0293209 A1* 10/2015 Fairley .................. G01S 13/449
    342/21
2015/0326463 A1* 11/2015 Solondz .............. H04L 43/0829
    370/252

OTHER PUBLICATIONS

Yoshimasa Egashira et al., "A novel IQ imbalance compensation method with pilot-signals for OFDM system", IEICE transaction B, vol. J91-B, No. 5, May 1, 2008, pp. 558-565 (Partial Translation).
Eric Spano et al., "Sequences of complementary codes for the optimum decoding of truncated ranges and high sidelobe suppression factors for ST/MST radar systems", IEEE Transactions on Geoscience and Remote Sensing, vol. 34, No. 2, Mar. 1, 1996, pp. 330-345.

\* cited by examiner

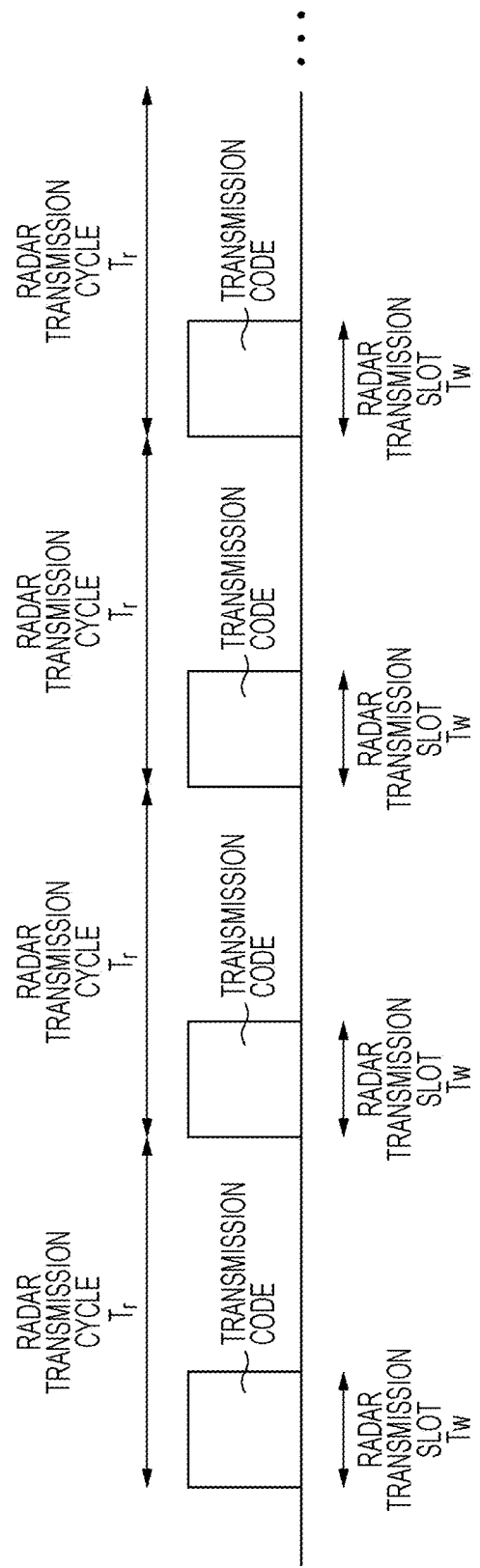

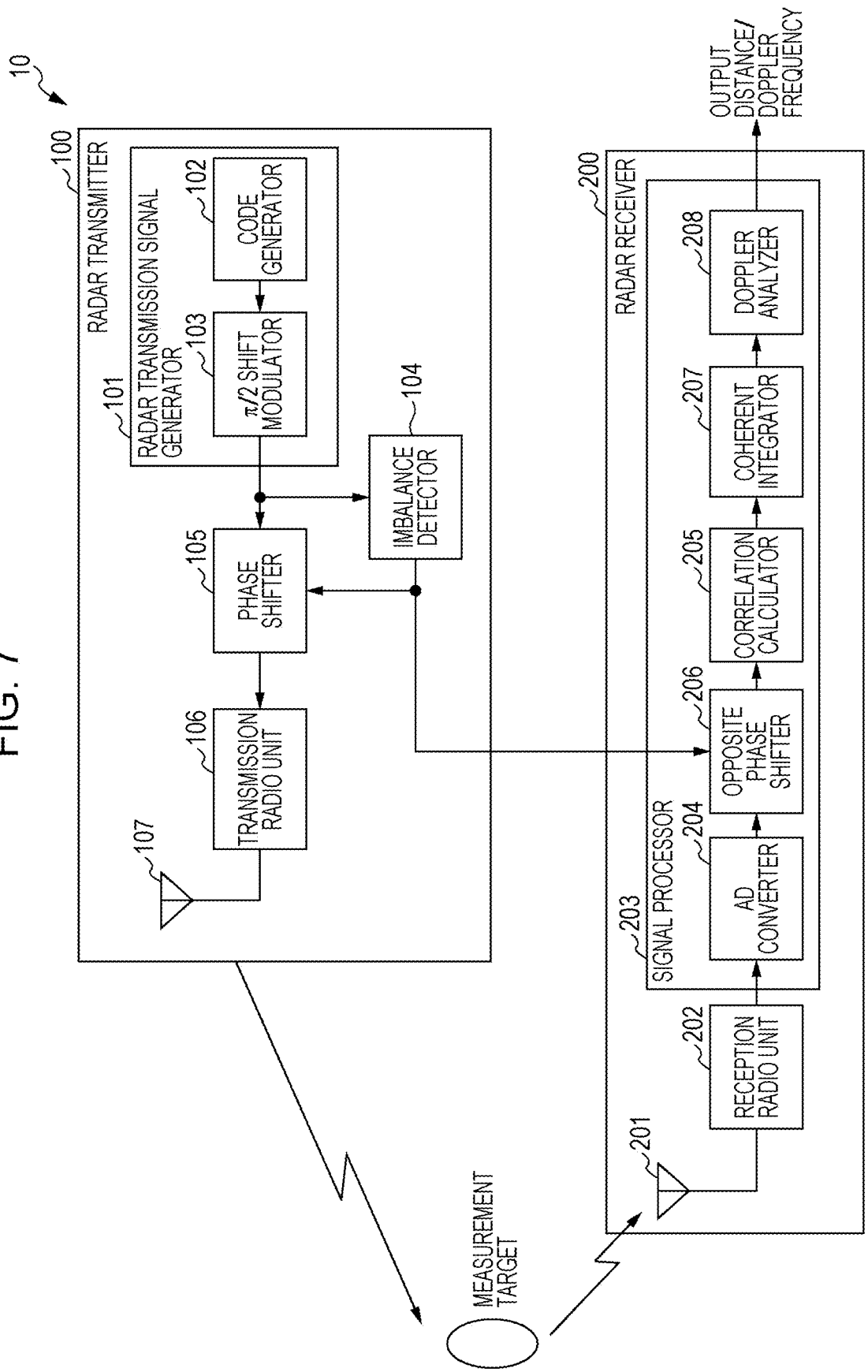

RADAR APPARATUS AND RADAR METHOD

BACKGROUND

1. Technical Field

The present disclosure relates to a radar apparatus and a radar method.

2. Description of the Related Art

In recent years, studies have been advancing on radar apparatuses using short-wavelength radar transmission signals, including microwaves or millimeter waves, which may achieve high resolution. On the other hand, in order to improve the safety outdoors, there is a demand for development of radar apparatuses (wide-angle radar apparatuses) to detect objects (targets) including not only vehicles but also pedestrians in a wide range of angle.

As such radar apparatuses, pulse-compression radar apparatuses are known, for example. In the case of detection of vehicles and pedestrians by a pulse-compression radar, reflection waves from pedestrians are much weaker than reflection waves from vehicles. Accordingly, the radar transmitter is required to have a transmission configuration to transmit pulse-compression waves with low range sidelobes, and the radar receiver is required to have a reception configuration including a wide dynamic range of reception.

For example, it is known to use, as the pulse compression codes to provide low-level range sidelobe characteristics, Barker codes, PN sequence codes, complementary codes, or the like. The following description is given of a case using complementary codes as an example. Complementary codes are composed of paired codes (hereinafter, referred to as complementary codes an and $b_n$. Herein, n=1, . . . , L. L is a code length). The autocorrelation operations of the two codes are expressed by the following expressions (1) and (2), respectively.

$$R_{aa}(\tau) = \sum_{n=1}^{L} a_n a_{n+\tau}^* \quad (1)$$

$$R_{bb}(\tau) = \sum_{n=1}^{L} b_n b_{n+\tau}^* \quad (2)$$

In expressions (1) and (2), $a_n=0$ and $b_n=0$ where n>L and n<1. When the results of the autocorrelation operations for the two codes are added up with the same shift time τ, the correlated value is 0 where τ is not 0 as illustrated in the following expression (3). It means that the complementary code has zero range sidelobes thereof.

$$\begin{cases} R_{aa}(\tau) + R_{bb}(\tau) \neq 0, \text{ when } \tau = 0 \\ R_{aa}(\tau) + R_{bb}(\tau) = 0, \text{ when } \tau \neq 0 \end{cases} \quad (3)$$

One of known pulse compression radars transmit the complementary codes $a_n$ and $b_n$ every predetermined radar transmission cycle in a time division manner.

One of the methods to generate complementary codes is disclosed in Budisin, S. Z., "New complementary pairs of sequences," Electron. Lett., 1990, 26, (13), pp. 881-883). According to this literature, complementary codes with code lengths L=4, 8, 16, 32, . . . , $2^P$ are sequentially generated based on codes A=[$a_1$, $a_2$]=[1, 1] and B=[$b_1$, $b_3$]=[1, −1], which are composed of elements 1 or −1 and have complementarity, for example. Pulse compression radars repeatedly transmit the aforementioned pulse compression codes a predetermined number of times in every radar transmission cycle to increase the reception level of radar reflection waves.

When the aforementioned pulse compression radar is configured to use a radio frequency band (RF band), such as millimeter-waves, an RF circuit and an analogue baseband circuit of the radar transmitter or receiver of the radar apparatus include circuit errors, which results in a lower radar detection performance (or low radar ranging performance) compared with the ideal characteristics obtained when no circuit errors are included.

SUMMARY

One non-limiting and exemplary embodiment provides a radar apparatus and a radar method in which the radar detection performance is prevented from degrading due to circuit errors.

In one general aspect, the techniques disclosed here feature a radar apparatus, including a radar transmitter which transmits a radar signal; and a radar receiver which receives a reflection wave signal being a reflection of the radar signal on a target. The radar transmitter includes: a generator that generates the radar signal composed of a transmission code with each sub-pulse given a predetermined phase shift; and a transmission radio unit that transmits the radar signal generated by the generator, in a predetermined transmission cycle. In radar signals transmitted by the transmission radio unit in a predetermined number of transmission cycles, code imbalances of transmission codes are included in all of four quadrants of an IQ plane, each of the code imbalances being an imbalance between positions where a plurality of sub-pulses constituting a transmission code included in a radar signal transmitted in each of the transmission cycles are mapped on the IQ plane.

It should be noted that general or specific embodiments may be implemented as a system, a method, an integrated circuit, a computer program, a storage medium, or any selective combination thereof.

According to the aspect of the disclosure, it is possible to suppress degradation of the radar detection performance due to circuit errors.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating an example of radar transmission signals according to Embodiment 1 of the disclosure;

FIG. 7 is a diagram illustrating another configuration example of the radar apparatus according to Embodiment 1 of the disclosure;

DETAILED DESCRIPTION

Figure 1:
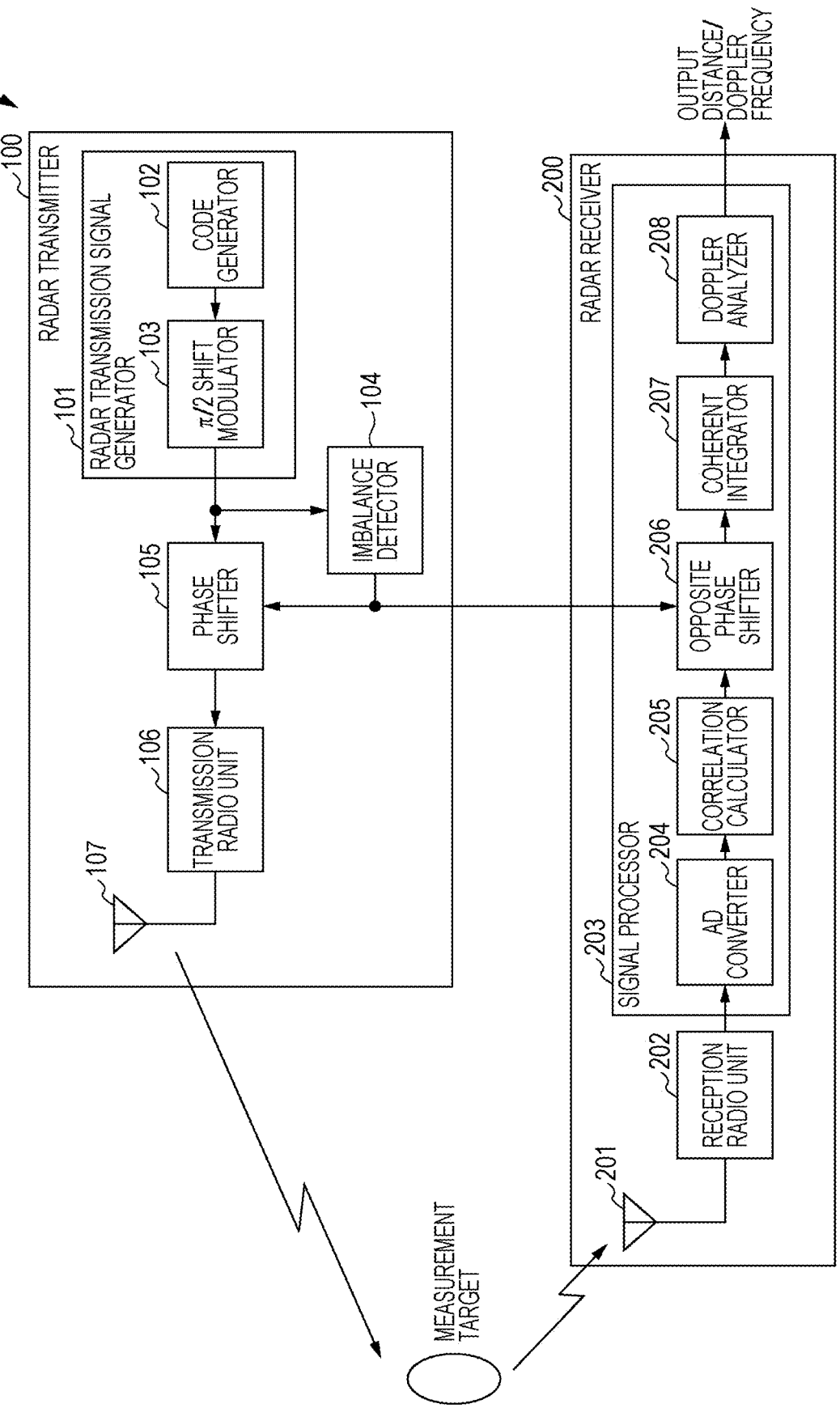
FIG. 1 is a block diagram illustrating a configuration example of a radar apparatus according to Embodiment 1 of the disclosure.

Circuit errors that can occur in a radar apparatus are: IQ mismatch, DC offsets, and the like in a quadrature modulator and a quadrature demodulator; phase noise in a frequency converter; and quantization noise in AD and DA converters.

The IQ mismatch (hereinafter, referred to as an IQ error) in the quadrature demodulator is represented using an amplitude error and a quadrature angle error (a phase error). When an IQ error occurs, the reception signal inputted into the quadrature demodulator is outputted as an In-phase signal (an I signal) and a quadrature signal (a Q signal) that include amplitude and phase errors. When a sinusoidal signal is inputted to a quadrature demodulator including an IQ error, for example, amplitude and phase errors occur depending on the amplitude and phase conditions of the inputted signal. This produces frequency components other than the frequency component of the inputted sinusoidal signal.

The radar apparatus transmits plural pulse compression signals and estimates the Doppler frequency of an object (a measurement target) based on changes in phase of the reception signal which is a signal of reflection of the transmitted pulse compression signal. If the quadrature demodulator includes an IQ error in this case, the radar apparatus detects incorrect Doppler frequency components as well as the Doppler frequency component of the measurement target. This increases false detection by the radar apparatus, resulting in degradation of the radar detection performance (ranging performance) thereof.

On the other hand, Japanese Patent Application Publication No. 2013-185945 discloses a configuration that inputs a signal for adjustment to a quadrature demodulator (an IQ mixer) to detect IQ errors. Moreover, a circuit configuration to correct an IQ error (an IQ imbalance circuit error) is disclosed in Egashira, et al., "A novel IQ imbalance compensation method with pilot-signals for OFDM system," IEICE transaction B, Vol. J91-B, No. 5, pp. 558-565, 2008.

Even if such circuits that detect or correct IQ errors are provided, the IQ errors cannot be completely removed, and some circuit error components remain in some cases. The circuit error components are integrated through coherent integration of the radar reception process, degrading the radar detection performance. Even if the remaining circuit error components are very small, for example, the remaining components increase to about 30 to 40 dB due to the effect of integration. Accordingly, radar apparatuses need to include a highly-accurate error detection mechanism. This can complicate the hard configuration thereof.

In an aspect of the disclosure, a description is given of a method to prevent degradation in the radar detection performance of a pulse compression radar with a simple configuration without adding a highly-accurate correction circuit to correct circuit errors even when the quadrature demodulator includes IQ errors.

Hereinafter, a description is given of embodiments according to an aspect of the disclosure in detail with reference to the drawings. In the embodiments, the same constituent elements are given the same reference numerals, and the description thereof is redundant and omitted.

Embodiment 1

[Configuration of Radar Apparatus]

FIG. 1 is a block diagram illustrating the configuration of a radar apparatus 10 according to Embodiment 1.

The radar apparatus 10 includes a radar transmitter 100 and a radar receiver 200.

The radar transmitter 100 generates a high frequency (radio frequency) radar signals (radar transmission signals). The radar transmitter 100 transmits the radar transmission signals in each predetermined transmission cycle.

The radar receiver 200 receives a reflection wave signal which is a reflection of the radar transmission signal on the measurement target. The radar receiver 200 performs processing in synchronization with the radar transmitter 100 using a reference signal (not illustrated), for example. The radar receiver 200 processes the received reflection wave signal for detection of the presence of the target, direction estimation, and the like, for example. The measurement target is an object to be detected by the radar apparatus 10 and includes vehicles (including four or two wheel vehicles) or human beings, for example.

[Configuration of Radar Transmitter 100]

The radar transmitter 100 includes a radar transmission signal generator 101, an imbalance detector 104, a phase shifter 105, a transmission radio unit 106, and a transmission antenna 107.

The radar transmission signal generator 101 modulates a code of a code length L to generate a baseband radar transmission signal (a pulse compression signal) every radar transmission cycle (Tr). The imbalance detector 104 detects a modulated code imbalance (described in detail later) of the radar transmission signal. The phase shifter 105 applies to the radar transmission signal, phase shifting to correct the modulated code imbalance.

The radar transmission signal generator 101 operates based on transmission reference clocks, the frequency of which is a predetermined multiple of the frequency of the reference signal (not illustrated). Hereinafter, the transmission reference clock frequency is indicated by $f_{T \times BB}$. Herein, the radar transmission cycle $(T_r = N_r \times (1/f_{T \times BB}))$ is an integer $N_r$ times a discrete time interval $(1/f_{T \times BB})$ which is determined by the transmission reference clock frequency $f_{T \times BB}$ as the predetermined multiple of the reference signal frequency.

The radar transmission signal generator 101 includes a code generator 102 and a $\pi/2$ shift modulator 103.

Specifically, the code generator 102 generates a transmission code of the code length L every radar transmission cycle $(T_r)$. More specifically, the code generator 102 generates a transmission code Code(m) of the code length L in the m-th radar transmission cycle.

Hereinafter, each element (sometimes referred to as a sub-pulse) of the transmission code(m) is represented as $C_n(m)$. Specifically, the transmission code Code(m) is composed of L elements $\{C_1(m), C_2(m), \ldots, C_L(m)\}$. The transmission code element $C_n(m)$ is a binary phase code compose of two values such as $\{-1, 1\}$. Herein, n=1, 2, ..., L, and m=1, 2, ..., Q. Q indicates the number of radar transmission cycles taken by the radar apparatus 10 to measure the range, the Doppler frequency, the direction of arrival, and the like.

The transmission codes can be Barker codes, complementary codes, M-sequence codes, Gold codes, and the like, that contribute to low range sidelobe characteristics, for example. The transmission codes can be a combination of plural types of codes. Transmitting such transmission codes composed of plural types of codes can contribute to low range sidelobe characteristics even in the presence of Doppler variation, reducing the interference between plural radar apparatuses. For example, Spano codes, which are composed of plural complementary codes, are proposed as the transmission codes in E. Spano and O. Ghebrebrhan, "Sequences of complementary codes for the optimum decoding of truncated ranges and high sidelobe suppression factors for ST/MST radar systems," IEEE Transactions on Geoscience and Remote Sensing, Vol. 34, No. 2, pp. 330-345, 1996. This implements the low range sidelobe characteristics even in the presence of Doppler variations.

The $\pi/2$ shift modulator 103 performs $\pi/2$ shift modulation for the transmission codes outputted from the code generator 102. Specifically, as shown in the following expression (4), the $\pi/2$ shift modulator 103 applies a phase shift of $\pi/2$ to the L elements $\{C_1(m), C_2(m), \ldots, C_L(m)\}$ of the transmission code Code(m) on a sub-pulse basis (or a transmission code element basis) to generate a modulated code MC(m). Hereinafter, the L elements of the modulated code MC (m) are represented as $\{MC_1(m), MC_2(m), \ldots, MC_L(m)\}$.

$$MC(m) = \{MC_1(m), MC_2(m), \ldots, MC_L(m)\} \quad (4)$$
$$= \{C_1(m)e^{j0}, C_2(m)e^{j\pi/2}, \ldots, C_L(m)e^{j(L-1)\pi/2}\}$$
$$= \{C_1(m), jC_2(m), \ldots, j^{(L-1)}C_L(m)\}$$

Herein, m=1, ..., Q. j is the imaginary unit, and $j = \exp(j\pi/2)$.

For the n-th element $C_n(m)$ of the transmission code Code(m), the n-th element $MC_n(m)$ of the modulated code MC(m) is mapped as shown in the following expression (5) by $\pi/2$ shift modulation.

$$MC_n(m) = \exp[j(n-1)\pi/2] C_n(m) \quad (5)$$

The $\pi/2$ shift modulator 103 performs predetermined upsampling for the modulated codes and applies a band limitation filter (for example, a low-pass filter (LPF), not illustrated) to the modulated codes to output a modulated signal $G(n_s)$ limited within a predetermined band.

The modulated signal $G(n_s)$ is represented as the following expression (6) where $I(n_s)$ is the In-phase component of the modulated signal $G(n_s)$ and $Q(n_s)$ is the quadrature component.

$$G(n_s) = I(n_s) + jQ(n_s) \quad (6)$$

Herein, $n_s$ is a natural number and represents a discrete time. The discrete time interval is $1/f_{T \times BB}$, and $f_{T \times BB}$ is a transmission reference clock frequency which is a predetermined multiple of the reference signal frequency.

The $\pi/2$ shift modulator 103 modulates the transmission codes outputted from the code generator 102 using samples corresponding to $N_o$ transmission reference clocks per code element. For each transmission code of the code length L, Nw $(=N_o \times L)$ samples are included in a radar signal slot Tw. The no-signal slot $(T_r - Tw)$ in each radar transmission cycle $(T_r)$ includes samples corresponding to $N_u$ $(=N_r - Nw)$ transmission reference clocks (see FIG. 2, for example). The modulated signal in the m-th radar transmission cycle is represented as the following expression (7). Herein, $k_s = 1, \ldots, N_r$.

$$G(N_r(m-1)+k_s) = I(N_r(m-1)+k_s) + jQ(N_r(m-1)+k_s) \quad (7)$$

As described above, the $\pi/2$ shift modulator 103 applies a phase shift of $\pi/2$ to the sub-pulses of the transmission code Code(m) (each code element $C_n(m)$ of the transmission code Code(m)). The radar transmission signal generator 101 thus generates a radar transmission signal composed of a transmission code with each sub-pulse given a predetermined phase shift (a phase shift of $\pi/2$).

This can increase signals mapped in each of the four quadrants of an IQ plane in the transmission codes. Accordingly, performing correlation processing in a later-described correlation calculator 205 of the radar receiver 200 smoothes IQ errors, reducing the influence of IQ errors on amplitude and phase errors.

Figure 3A:
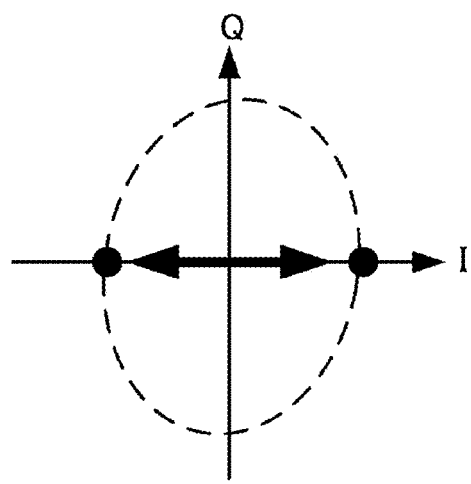
FIG. 3A is a diagram illustrating a mapping example of binary codes on an IQ plane including IQ errors.
Figure 3B:
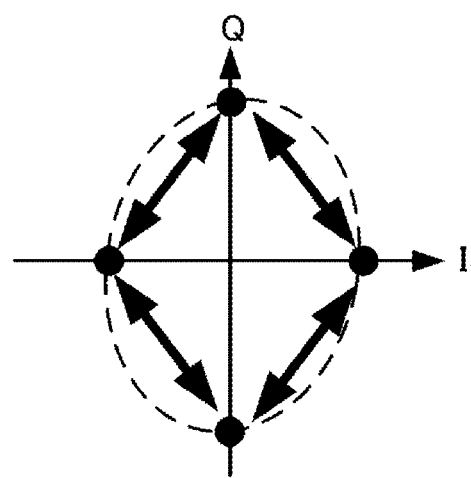
FIG. 3B is a diagram illustrating a mapping example of binary codes on an IQ plane including IQ errors which are subjected to π/2 shift modulation.

FIG. 3A illustrates mapping of binary codes on an IQ plane including an IQ error, and FIG. 3B illustrates mapping of binary codes subjected to $\pi/2$ shift modulation on the IQ plane including an IQ error. As illustrated in FIGS. 3A and 3B, the IQ plane including an IQ error includes elliptical distortion.

As illustrated in FIG. 3A, mapping of binary codes is mapping in two quadrants of the IQ plane. When the received signal's phase changes due to Doppler variations, the amplitude changes in accordance with the distortion condition of the IQ plane. On the other hand, as illustrated in FIG. 3B, mapping of binary codes subjected to $\pi/2$ shift modulation is mapping in the four quadrants of the IQ plane. The components mapped in the four quadrants are equalized. It is therefore possible to reduce variations in amplitude even if the received signal's phase changes due to Doppler variations.

The aforementioned matters are described using Spano codes with a code length L=4 by way of example.

As for Spano codes with a code length L=4, eight (=2L) codes are transmitted so that codes A and B, which constitute a complementary code pair, and codes A' and B', which include the same elements as those of the respective codes A and B in reverse order, are combined as follows. In this case, the code generator 102 cyclically generates Codes (1) to (8) of the following expression (8). In the following description, m=1, . . . , 8.

$$[Code(1), Code(2), \ldots Code(8)] = [A, B, B', A', B, A, A', B'] \quad (8)$$

Herein, the elements of the code A are $\{-1, -1, -1, 1\}$, and the elements of the code B are $\{1, -1, 1, 1\}$. The elements of the codes A' and B' are in reverse order to those of the codes A and B, respectively. The elements of the codes A' and B' are $\{1, -1, -1, -1\}$ and $\{1, 1, -1, 1\}$, respectively.

The $\pi/2$ shift modulator 103 applies a phase shift of $\pi/2$ to each sub-pulse (each code element) of the transmission codes Code (m), so that the sub-pulses (code elements) of the transmission codes (modulated codes) $A_{MC}$, $B_{MC}$, $B'_{MC}$, and $A'_{MC}$, which are obtained by modulating the transmission codes A, B, B', and A', respectively, are expressed as follows.

Modulated code of the transmission code A: $A_{MC}=\{-1, -j, 1, -j\}$
Modulated code of the transmission code B: $B_{MC}=\{1, -j, -1, -j\}$
Modulated code of the transmission code B': $B'_{MC}=\{1, j, 1, -j\}$
Modulated code of the transmission code A': $A'_{MC}=\{1, -j, 1, j\}$ In the $\pi/2$ shift modulator 103, the elements of the transmission codes (modulated code) obtained by performing the $\pi/2$ shift modulation for Codes (1) to (8) outputted from the code generator 102 are represented by the following the expression (9).

$$[MC(1), MC(2), \ldots, MC(8)] = [A_{MC}, B_{MC}, B'_{MC}, A'_{MC}, B_{MC}, A_{MC}, A'_{MC}, B'_{MC}] \quad (9)$$

Herein, when the code length L is comparatively short, like 4, 8, and 16, the phase shift modulation for each sub-pulse in the transmission codes cannot provide a sufficient smoothing effect in some cases. In Embodiment 1, the radar transmitter 100 uses the imbalance detector 104 and phase shifter 105 to smooth IQ errors by applying phase shifting to the transmission codes in plural radar transmission cycles.

The imbalance detector 104 uses each element of the modulated codes generated by the $\pi/2$ shift modulator 103 to detect an imbalance (hereinafter, referred to as a modulated code imbalance) in the IQ plane for each transmission code (modulated code). The modulated code imbalance represents an imbalance between the positions at which the plural sub-pulses constituting each transmission code are mapped on the IQ plane.

As the modulated code imbalance, the imbalance detector 104 calculates an element sum of the sub-pulses (elements) constituting each modulated code, for example. When the elements of the modulated codes are uniformly mapped to $\{1, j, -1, -j\}$ due to the $\pi/2$ shift modulation, for example, the element sum is zero, and the elements of the modulated code are considered to be balanced with no modulated code imbalance. On the other hand, when the elements of the modulated codes are not uniformly mapped to $\{1, j, -1, -j\}$ due to the $\pi/2$ shift modulation, for example, the element sum is not zero, and the degree of the modulated code imbalance is reflected on the value of the element sum.

Herein, normalizing the calculated element sum by the number of elements used in calculation of the element sum (the code length L in this case) is generally equivalent to calculating the center of gravity. The "modulated code imbalance" used in Embodiment 1 can be therefore considered as the "center of gravity of each modulated code".

Hereinafter, a description is given of a case of Spano codes of code length L=4. Each modulated code is represented by expression (9).

In this case, the modulated code imbalance (element sum) $S_{MC}(m)$ of each modulated code MC(m) is represented by the following expression (10).

$$[S_{MC}(1), S_{MC}(2), \ldots, S_{MC}(8)] = [-2j, -2j, 2, 2, -2j, -2j, 2, 2] \quad (10)$$

Herein, in the case of complementary codes, the range sidelobes of each pair of complementary codes (in the case of expression (9), the transmission codes $A_{MC}$ and $B_{MC}$, the transmission codes $B'_{MC}$ and $A'_{MC}$ the transmission codes $B_{MC}$ and $A_{MC}$, and the transmission codes $A'_{MC}$ and $B'_{MC}$) cancel each other. Accordingly, it is preferable that each pair of complementary codes has an identical phase. When each pair of complementary codes is configured to have an identical phase, the imbalance detector 104 adds two modulated code imbalances of a complementary code pair (or calculates the element sum of the complementary code pair) every two radar transmission cycles in which the modulated codes constituting the complementary code pair are transmitted, as a modulated code imbalance of the complementary code pair.

The phase shifter 105 applies phase shifting to correct the modulated code imbalance detected by the imbalance detector 104, to the corresponding transmission code (modulated code) outputted from the radar transmission signal generator 101. The phase shifter 105 outputs to the transmission radio unit 106, the transmission code (radar transmission signal) given a phase shift.

Specifically, when the transmission codes are complementary codes, the phase shifter 105 gives a later-described phase shift PhaseRot(m), which is to correct the modulated code imbalance, to the transmission codes every two radar transmission cycles corresponding to the complementary code pair. In the following, angle [x] indicates the argument of a complex number x. In other words, angle $[x]=\tan^{-1}(\text{Im}(x)/\text{Re}(x))$ [rad]. Herein, Re(x) and Im(x) are real part and imaginary part of the complex number x, respectively, and m=1, . . . , Q.

When m is an odd number, $$\text{PhaseRot}(m) = \text{angle}[\exp(j(\text{ceil}(m/2)-1)\pi/2)\{S_{MC}(m) + S_{MC}(m+1)\}^* S_{MC}(1)] \quad (11)$$

When m is an even number, $$\text{PhaseRot}(m) = \text{angle}[\exp(j(\text{ceil}(m/2)-1)\pi/2) \{S_{MC}(m-1)+S_{MC}(m)\}^* S_{MC}(1)] \quad (12)$$

The phase shifting shown in expressions (11) and (12) gives to the argument of the "modulated code imbalance of a complementary code pair" included in the transmission codes (angle[$S_{MC}(m)+S_{MC}(m+1)$] when m is an odd number and angle[$S_{MC}(m-1)+S_{MC}(m)$] when m is an even number), phase correction subjected to phase conjugation (that is, angle[$\{S_{MC}(m)+S_{MC}(m+1)\}^*$] when m is an odd number and angle[$\{S_{MC}(m-1)+S_{MC}(m)\}^*$] when m is an even number). The argument of the "modulated code imbalance of the complementary code pair" is thereby set to zero. The phase shifting shown in the expressions (11) and (12) therefore gives a phase shift of $\pi/2$ to the "modulated code imbalance of a complementary code pair" included in the transmission codes every two radar transmission cycles corresponding to the complementary code pair, independently of the argument of the "modulated code imbalance of the complementary code pair". Specifically, the "modulated code imbalances of complementary code pairs" are subjected to phase shifting of {angle[$S_{MC}$(1)]exp(j×0), angle[$S_{MC}$(1)]exp(j×0), angle[$S_{MC}$(1)]exp(j×π/2), angle[$S_{MC}$(1)]exp(j×π/2), angle[$S_{MC}$(1)]exp(j×π), angle[$S_{MC}$(1)]exp(j×π), angle[$S_{MC}$(1)]exp(j×3π/2), angle[$S_{MC}$(1)]exp(j×3π/2)} in each transmission cycle.

The following expressions (13) and (14) may be used instead of the expressions (11) and (12).

When m is an odd number, $$\text{PhaseRot}(m) = \text{angle}[\exp(j(\text{ceil}(m/2)-1)\pi/2)\{S_{MC}(m) + S_{MC}(m+1)\}^*] \quad (13)$$

When m is an even number, $$\text{PhaseRot}(m) = \text{angle}[\exp(j(\text{ceil}(m/2)-1)\pi/2)\{S_{MC}(m-1) + S_{MC}(m)\}^*] \quad (14)$$

The phase shifting shown in expressions (13) and (14) gives to the argument of the "modulated code imbalance of a complementary code pair" included in the transmission codes (angle[$S_{MC}$(m)+$S_{MC}$(m+1)] when m is an odd number and angle[$S_{MC}$(m−1)+$S_{MC}$(m)] when m is an even number), phase correction subjected to phase conjugation (that is, angle[{$S_{MC}$(m)+$S_{MC}$(m+1)}*] when m is an odd number and angle[{$S_{MC}$(m−1)+$S_{MC}$(m)}*] when m is an even number). The argument of the "modulated code imbalance of the complementary code pair" is thereby set to zero. The phase shifting shown in the expressions (13) and (14) therefore gives a phase shift of π/2 to the "modulated code imbalance of a complementary code pair" included in the transmission codes every two radar transmission cycles corresponding to the complementary code pair, independently of the argument of the "modulated code imbalance of the complementary code pair". Specifically, the "modulated code imbalances of complementary code pairs" are subjected to phase shifting of {exp(j×0), exp(j×0), exp(j×π/2), exp(j×π/2), exp(j×π), exp(j×π), exp(j×3π/2), exp(j×3π/2)} in each transmission cycle. The expressions (13) and (14) are different from the expressions (11) and (12) in applying phase shifting independently of angle[$S_{MC}$(1)].

When the transmission codes are not complementary codes, the phase shifter 105 may give a phase shift PhaseRot (m) to correct the modulated code imbalance at each radar transmission cycle as shown in expression (15).

$$\text{PhaseRot}(m) = \text{angle}[\exp(j(m-1)\pi/2)S_{MC}(m)^*S_{MC}(1)] \quad (15)$$

The following expression (16) may be used instead of the expression (15).

$$\text{PhaseRot}(m) = \text{angle}[\exp(j(m-1)\pi/2)S_{MC}(m)^*] \quad (16)$$

Hereinafter, a description is given of a case of Spano codes of code length L=4. The modulated code imbalances (element sums) are represented by the expression (10).

In this case, the modulated code imbalances of complementary code pairs (complementary code pair element sums) are represented by the following expression (17).

$$[S_{MC}(1)+S_{MC}(2), \ldots, S_{MC}(7)+S_{MC}(8)] = [-4j, 4, -4j, 4] \quad (17)$$

In the example shown in the expression (17), it is revealed that the modulated code imbalances of the complementary code pairs are concentrated to two points on the IQ plane.

To equalize the modulated code imbalances in the four quadrants of the IQ plane, the phase shifter 105 calculates the phase shifts PhaseRot(m) to correct modulated code imbalances in accordance with the expressions (11) and (12) as shown in the following expression (18), for example.

$$\{\text{PhaseRot}(1), \text{PhaseRot}(2), \ldots, \text{PhaseRot}(8)\} = \{1, 1, 1, 1, -1, -1, -1, -1\} \quad (18)$$

The phase shifter 105 may calculate the phase shifts PhaseRot(m) to correct modulated code imbalances in accordance with the expressions (13) and (14) as shown in the following expression (19), for example.

$$\{\text{PhaseRot}(1), \text{PhaseRot}(2), \ldots, \text{PhaseRot}(8)\} = \{-j, -j, -j, -j, j, j, j, j\} \quad (19)$$

To a modulated signal (modulated code) in the m-th radar transmission cycle, the phase shifter 105 then gives the phase shift PhaseRot(m) to correct the modulated code imbalance calculated as described above, as shown in the following expression (20).

$$\exp[j\text{PhaseRot}(m)]G(N_r(m-1)+k_s)) \quad (20)$$

For example, when the modulated codes MC(m) include the respective modulated code imbalances $S_{MC}$(m) shown in the expression (10), the phase shifter 105 gives the phase shifts PhaseRot(m) shown in the expression (18) to the modulated codes MC(m) (see the expression (9), for example). The modulated code imbalances $S'_{MC}$(m) of the modulated codes MC(m) after phase shifting (after correction) are represented by the following expression (21), and the modulated code imbalances of the complementary code pairs are represented by the following expression (22).

$$[S'_{MC}(1), S'_{MC}(2), \ldots, S'_{MC}(8)] = [-2j, -2j, 2, 2, 2j, 2j, -2, -2] \quad (21)$$

$$[S'_{MC}(1)+S'_{MC}(2), \ldots, S'_{MC}(7)+S'_{MC}(8)] = [-4j, 4, 4j, -4] \quad (22)$$

In such a manner, in a predetermined number of transmission cycles (8 (=2L) cycles in the above example), the modulated code imbalances $S'_{MC}$(m), each of which is the imbalance between the positions where plural sub-pulses (code elements) constituting the transmission code Code(m) (modulated code MC(m)) included in the radar transmission signal transmitted in each transmission cycle are mapped on the IQ plane, are included in all of the four quadrants of the IQ plane independently of the arguments of the modulated code imbalances. In the later-described radar receiver 200, components mapped in the four quadrants are equalized in a period corresponding to the predetermined number of transmission cycles, so that variation in amplitude can be suppressed even if the reception signal's phase changes due to Doppler variations.

The transmission radio unit 106 performs quadrature-modulation and frequency conversion for the signals outputted from the phase shifter 105 to generate the radar transmission signals in a carrier frequency band (radio frequency (RF) band. The transmission radio unit 106 then amplifies the radar transmission signals to a predetermined transmission power through a transmission amplifier and outputs the amplified radar transmission signals to the transmission antenna 107. The transmission antenna 107 radiates the radar transmission signals outputted from the transmission radio unit 106 into space.

To local oscillators included in the transmission radio unit 106 and a later-described reception radio unit 202, the common reference signal is added. The local oscillators of the transmission radio unit 106 and reception radio unit 202 are thereby synchronized.

Figure 4:
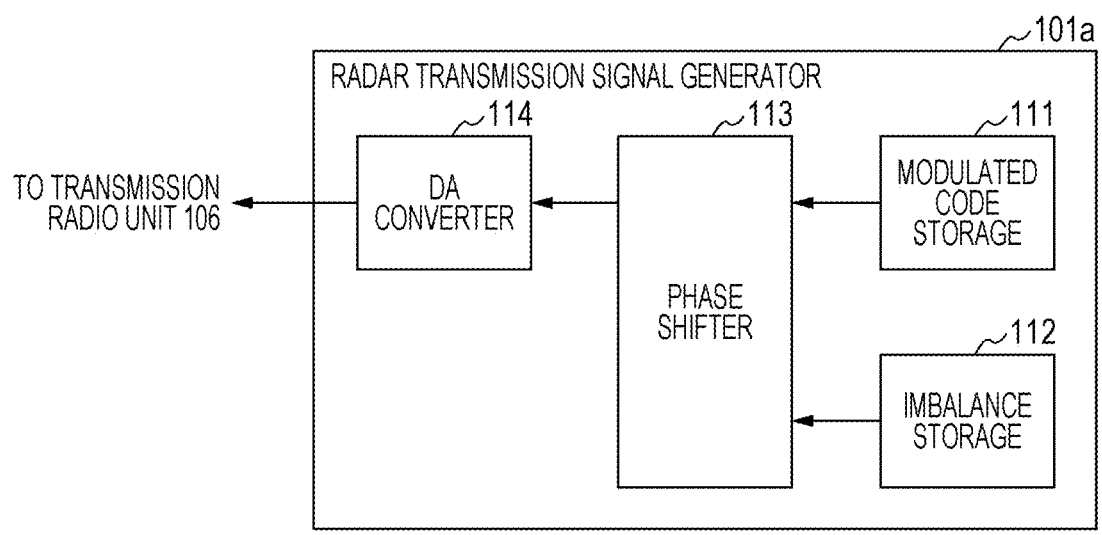
FIG. 4 is a block diagram illustrating another configuration of a radar transmission signal generator according to Embodiment 1 of the disclosure.

The radar transmitter 100 may include a radar transmission signal generator 101a (illustrated in FIG. 4) instead of the radar transmission signal generator 101. The radar transmission signal generator 101*a* does not include the code generator 102 and π/2 shift modulator 103 illustrated in FIG. 1 but includes a modulated code storage 111, an imbalance storage 112, a phase shifter 113, and a DA converter 114 instead. The modulated code storage 111 previously stores a code sequence generated in the radar transmission signal generator 101 illustrated in FIG. 1 and sequentially and cyclically reads the stored code sequence. The imbalance storage 112 previously stores imbalances of the modulated codes stored in the modulated code storage 111 (the modulated code imbalances detected by the imbalance detector 104 illustrated in FIG. 1)) and sequentially and cyclically reads the stored modulated code imbalances. The phase shifter 113 applies phase shifting to correct modulated code imbalances to the modulated codes based on the outputs from the modulated code storage 111 and imbalance storage 112. The DA converter 114 converts the code sequence (digital signal) outputted from the phase shifter 113, to an analogue signal.

[Configuration of Radar Receiver 200]

In FIG. 1, the radar receiver 200 includes a reception antenna 201, the reception radio unit 202, and a signal processor 203.

The reception antenna 201 receives a signal (a reflection wave signal) which is a reflection of a RF radar transmission signal transmitted from the radar transmitter 100 on a reflective object including a measurement target. The reception antenna 201 outputs the received reflection wave signal to the reception radio unit 202 as a reception signal.

The reception radio unit 202 amplifies the reception signal outputted from the reception antenna 201 to a predetermined level and performs frequency conversion for the high-frequency reception signal into a baseband reception signal. The 202 converts the baseband reception signal to a baseband reception signal including an I signal (an In-phase signal component) and a Q signal (a quadrature signal component).

The signal processor 203 includes an AD converter 204, a correlation calculator 205, an opposite phase shifter 206, a coherent integrator 207, and a Doppler analyzer 208.

Each component of the signal processor 203 operates based on the reception reference clocks of a frequency which is a predetermined multiple of the frequency of the reference signal (not illustrated). The reception reference clock frequency is indicated by $f_{R \times BB}$ below. Herein, each radar transmission cycle ($T_r$) is an integer $N_V$ times a discrete time interval ($1/f_{R \times BB}$) which is determined by the reception reference clock frequency $f_{R \times BB}$ as the predetermined multiple of the reference signal frequency ($T_r = N_v \times (1/f_{R \times BB})$). In the followings, the transmission reference clock frequency $f_{T \times BB}$ has a relationship of $f_{T \times BB} = f_{R \times BB} \times N_{TR}$ (an integer $N_{TR}$ times the reception reference clock frequency $f_{R \times BB}$).

The AD converter 204 samples the baseband signal including the I signal and Q signal outputted from the reception radio unit 202 at discrete times ($1/f_{R \times BB}$) based on the reception reference clock frequency $f_{R \times BB}$ for conversion of the I signal and Q signal to digital data.

In the following description, the baseband reception signal including the I and Q signals at a discrete time k is represented as complex signal $x(k) = I_r(k) + jQ_r(k)$. In the following description, the discrete time k is set to 1 at the time when the m-th radar transmission cycle ($T_r$) starts (k=1). The signal processor 203 cyclically performs measurement until the radar transmission cycle $T_r$ ends. In this case, k=1, . . . , $N_v$. Herein, j is the imaginary number.

The output signal from the AD converter 204 in the m-th radar transmission cycle is represented by the following expression (23). Hereinafter X(k) is called a complex baseband signal.

$$X(N_v(m-1)+k) = I_r(N_v(m-1)+k) + jQ_r(N_v(m-1)+k) \quad (23)$$

The correlation calculator 205 calculates the correlation between the complex baseband signal $X(N_v(m-1)+k)$ outputted from the AD converter 204 and the m-th modulated code $MC_n(m)$ transmitted by the radar transmitter 100 every radar transmission cycle $T_r$. Herein, n=1, . . . , L. For example, the correlation value AC(k, m) of sliding correlation operation at the discrete time k in the m-th radar transmission cycle is calculated based on the following expression (24).

$$AC(k, m) = \sum_{n=1}^{L} X(N_v(m-1) + N_o(n-1)/N_{TR} + k)MC_n(m)^* \quad (24)$$

In the expression (24), asterisk (*) indicates the complex conjugate operator. Herein, k=1, . . . , $N_v$.

The measurement range (the range of k) of the correlation operation performed by the correlation calculator 205 is not only k=1, . . . , $N_v$ but also may be limited in accordance with the range where the target as an object to be measured by the radar apparatus 10 can exist. This can reduce the processing amount by the correlation calculator 205 in the radar apparatus 10. For example, the correlation calculator 205 may limit the measurement range to k=Nw/$N_{TR}$+1, . . . , (Nu−Nw)/$N_{TR}$. In this case, the radar apparatus 10 does not perform measurement in a time slot corresponding to the code transmission slot Tw.

The process by the correlation calculator 205 is therefore not performed during the period when the radar transmission signal can directly enter the radar receiver 200. Even if radar transmission signals directly enter the radar receiver 200, therefore, the radar apparatus 10 is able to perform measurement without being influenced by the directly received radar transmission signals. In the case of limiting the measurement range (the range of k), the limited measurement range (the range of k) is also applied to the processes in the opposite phase shifter 206, coherent integrator 207, and Doppler analyzer 208. This can reduce the processing amount of each constituent components, thus reducing the power consumption in the radar receiver 200.

The opposite phase shifter 206 applies to the signal (correlation value) outputted from the correlation calculator 205, every radar transmission cycle ($T_r$), a phase shift exp[−jPhaseRot(m)] in the direction opposite to (that cancels) the phase shift given in the phase shifter 105 of the radar transmitter 100. Specifically, in the m-th radar transmission cycle ($T_r$), the opposite phase shifter 206 outputs a signal ACP(k, m) obtained by applying phase shifting to the output AC(k, m) from the correlation calculator 205.

$$ACP(k, m) = \exp[-j\text{PhaseRot}(m)]AC(k, m) \quad (25)$$

Using the correlation value ACP(k, m) outputted from the opposite phase shifter 206 at each discrete time k in the m-th radar transmission cycle (Tr), the coherent integrator 207 adds the correlation value ACP(k, m) at each discrete time k (coherent integration) in a predetermined number $N_e$ of radar transmission cycles, thereby calculating a coherent integral value ACC(k, v) at each discrete time k. Herein, k=1, . . . , $N_v$.

Specifically, the v-th coherent integral value ACC(k, v) is calculated by the following expression (26).

$$ACC(k, v) = \sum_{m=1}^{Ne} ACP(k, N_e(v-1) + m) \qquad (26)$$

Herein, the predetermined number Ne is set to a multiple of 4. When the transmission codes are complementary codes, the predetermined number $N_e$ is set to a multiple of 8. Even if the reception radio unit 202 includes IQ errors, the IQ errors can be smoothed by one or several additions for reception signals included in the four quadrants of the IQ plane as a unit by the coherent integrator 207. This can suppress the degradation of the radar performance due to amplitude and phase errors in the IQ plane.

The Doppler analyzer 208 performs a Doppler frequency analysis for the output signal from the coherent integrator 207. Specifically, the Doppler analyzer 208 performs the Doppler frequency analysis on a basis of the $N_d$ outputs ACC(k, 1) to ACC(k, $N_d$) of the coherent integrator 207 as a unit, which are obtained at each discrete time k, with the discrete time k in synchronization. More specifically, as shown in the following expression (27), the Doppler analyzer 208 performs coherent integration after correcting phase variations $\Psi(f_s)=2\pi f_s(T_r \times N_e)\Delta\Psi$ in accordance with $2N_f$ different Doppler frequencies $f_s\Delta\Psi$.

$$FT\_CI(k, f_s) = \sum_{q=0}^{N_d-1} ACC(k, q+1)\exp[-j\psi(f_s)q]$$
$$= \sum_{q=0}^{N_d-1} ACC(k, q+1)\exp[-j2\pi f_s T_r N_e q \Delta\phi] \qquad (27)$$

Herein, FT_CI(k, $f_s$) indicates a result of coherent integration of Doppler frequencies $f_s\Delta\Psi$ at the discrete time k by the Doppler analyzer 208. Herein, $f_s=-N_f+1, \ldots, 0, \ldots, N_f$, and $k=1, \ldots, (N_r+N_u)N_s/N_o$. $\Delta\Psi$ is a unit of phase rotation.

The signal processor 203 thereby obtains the results of coherent integration corresponding to the $2N_f$ Doppler frequency components at each discrete time k, FT_CI(k, $-N_f+1$), FT_CI(k, $N_f-1$), for each period corresponding to plural numbers $N_e \times N_d$ of the radar transmission cycles $T_r$ ($T_r \times N_e \times N_d = T_r \times Q$). Herein, j is the imaginary unit.

When $\Delta\Psi=1/N_d$, the processing of the Doppler analyzer 208 is equivalent to discrete Fourier transform (DFT) for the outputs of the coherent integrator 207 with a sampling interval of $T_r \times N_e$, or a sampling frequency of $1/(T_r \times N_e)$.

Moreover, when $N_f$ is set to a power of 2, fast Fourier transform (FFT) can be applied in the Doppler analyzer 208, thus reducing the processing amount. When $N_f > N_d$, FFT can be applied in a similar manner by performing zero padding in the region of $q > N_d$ as ACC(k, $N_d(w-1)+q+1)=0$, reducing the processing amount.

Based on the outputs FT_CI(k, $f_s$) of the Doppler analyzer 208, the radar apparatus 10 estimates the range/Doppler frequency (relative velocity) of the radar measurement target.

The square |FT_CI(k, $f_s$)|² of the absolute value of the output FT_CI(k, $f_s$) from the Doppler analyzer 208 corresponds to the reception level of reflection waves from the target at each Doppler frequency fs and each discrete time k. The radar apparatus 10 estimates the range R(k) to the target based on the discrete time k and Doppler frequency f at which the power increases from the noise level to a predetermined peak level or higher and estimates the relative velocity $v_d(f_s)$ based on the Doppler frequency in the following manner. Herein, $f_s=-N_f+1, \ldots, 0, \ldots, N_f$, and $k=1, (N_r+N_u)N_s/N_o$.

To translate the time information k to the range information R(k), the following expression (28) is used. Herein, Tw is the code transmission slot; L is the pulse code length; and $C_0$ is the velocity of light.

$$R(k) = k\frac{T_w C_0}{2L} \qquad (28)$$

To translate the Doppler frequency information $f_s$ to the relative velocity component $V_d(f_s)$, the following expression (29) is used. Herein, $\lambda$ is the wavelength of the carrier frequency of the RF radar transmission signal outputted from the transmission radio unit 106.

$$v_d(f_s) = \frac{\lambda}{2}f_s\Delta\psi \qquad (29)$$

The effects of the operations of the imbalance detector 104, phase shifter 105, and opposite phase shifter 206 described above are confirmed using computer simulations. The results thereof are shown below.

Figure 5A:
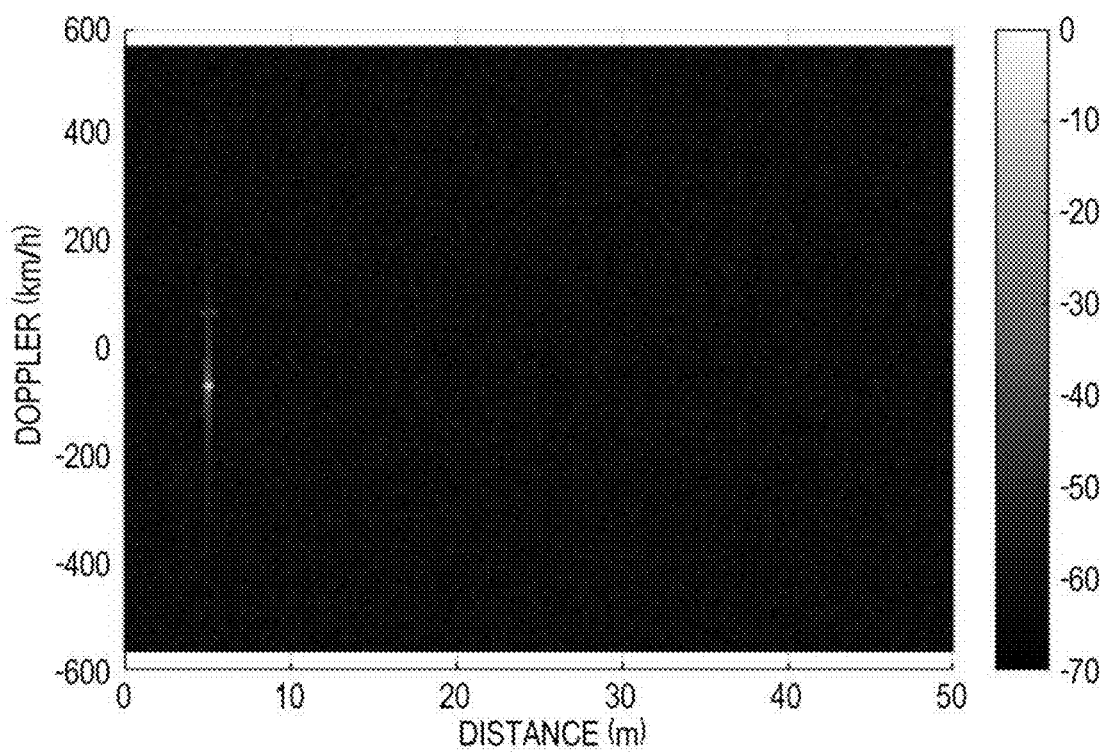
FIG. 5A is a diagram illustrating an example of computer simulation results for outputs from a Doppler analyzer when phase shifting to correct a modulated code imbalance is not performed.
Figure 5B:
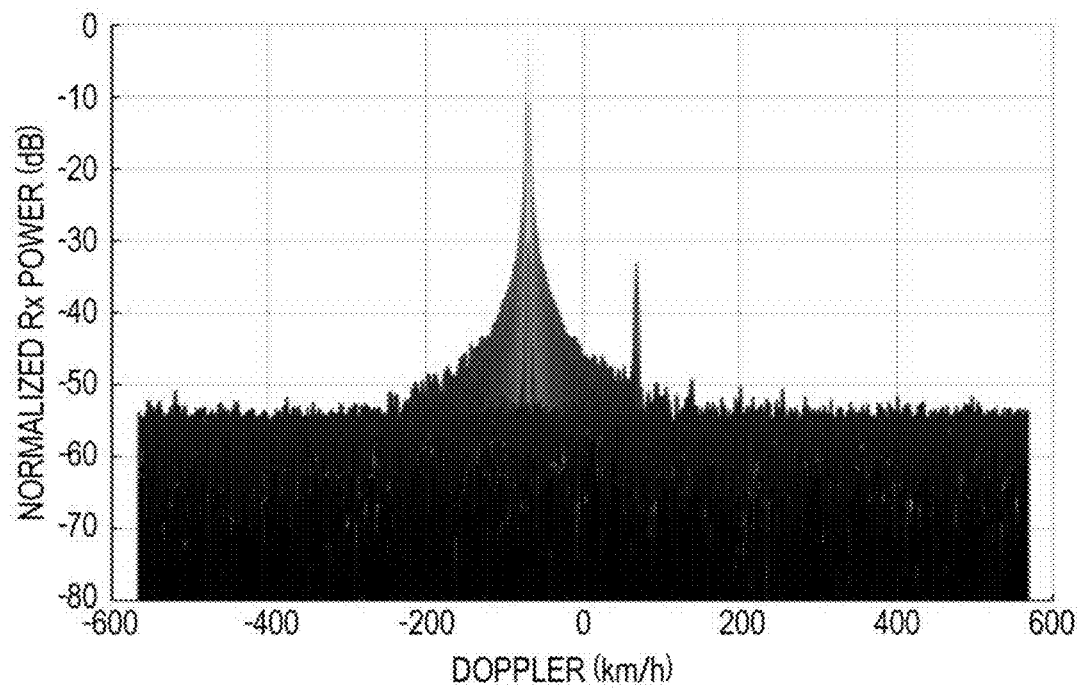
FIG. 5B is a diagram illustrating an example of computer simulation results for outputs from the Doppler analyzer when the phase shifting to correct a modulated code imbalance is not performed.
Figure 6A:
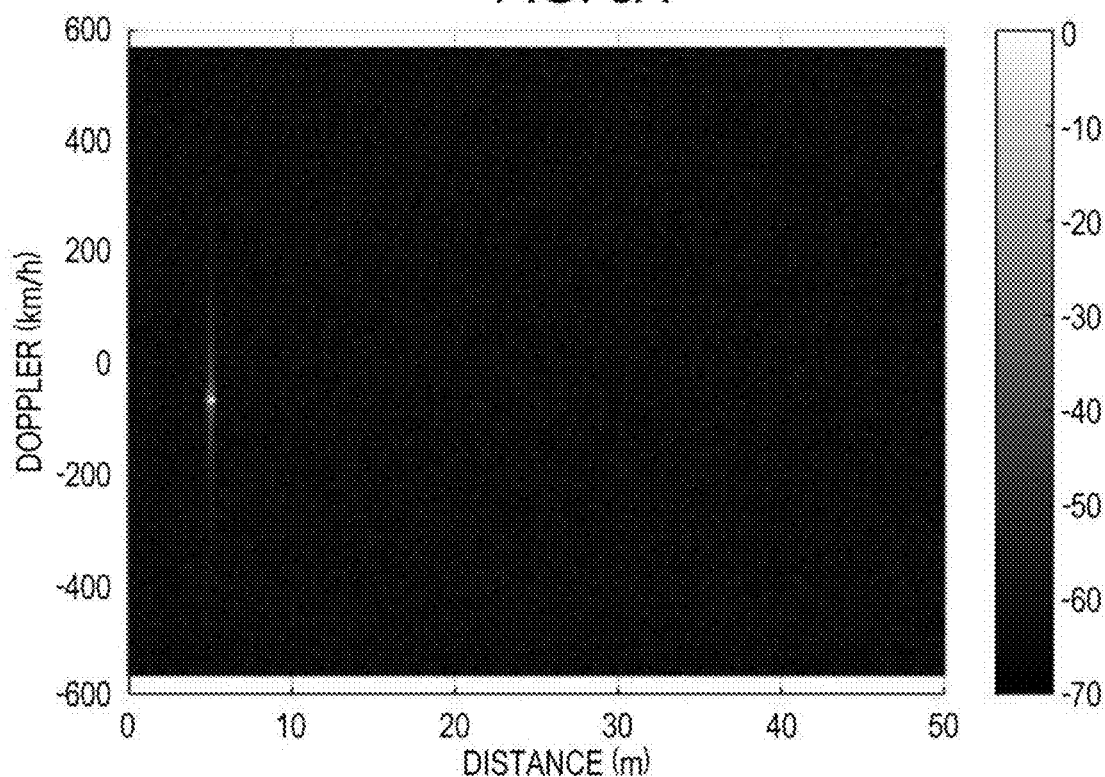
FIG. 6A is a diagram illustrating an example of computer simulation results for outputs from the Doppler analyzer when the phase shifting to correct a modulated code imbalance is performed according to Embodiment 1 of the disclosure.
Figure 6B:
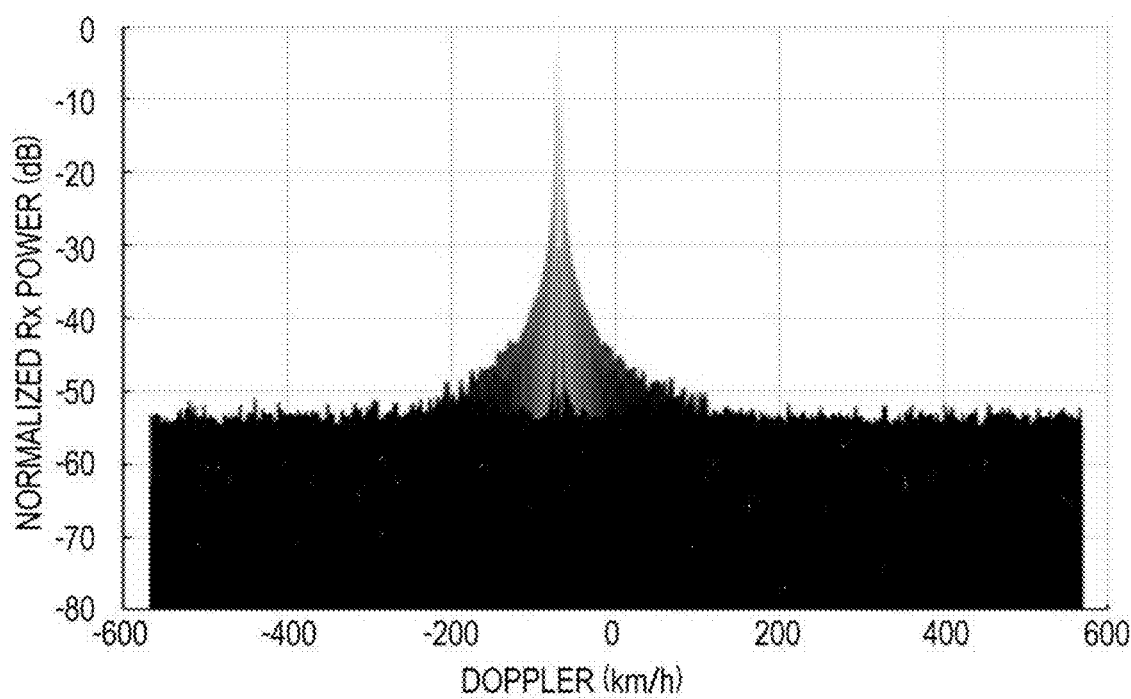
FIG. 6B is a diagram illustrating an example of computer simulation results for outputs from the Doppler analyzer when the phase shifting to correct a modulated code imbalance is performed according to Embodiment 1 of the disclosure.

FIGS. 5A and 5B and FIGS. 6A and 6B illustrate outputs (reception levels) from the Doppler analyzer 208 under the conditions where one measurement target moves away from the radar apparatus 10 at a distance of 5 m and a velocity of 70 km/h. FIGS. 5B and 6B are diagrams plotting the outputs of the Doppler analyzer 208 corresponding to the distance of 5 m.

In FIGS. 5A and 5B and FIGS. 6A and 6B, the conditions of IQ errors of the reception radio unit 202 are: an IQ amplitude error of 0.1 dB and an IQ angular error of 5 degree. FIGS. 5A and 5B and FIGS. 6A and 6B illustrate the results of computer simulations performed under the following conditions: the radar transmission codes are Spano codes (code length L=4); the number $N_e$ of additions by the coherent integrator 207 is 16; and the number $N_d$ of samples in the Doppler analyzer 208 is 512.

FIGS. 5A and 5B illustrate outputs of the Doppler analyzer 208 when phase shifting to correct modulated code imbalances is not applied. FIGS. 6A and 6B illustrate outputs of the Doppler analyzer 208 when phase shifting to correct modulated code imbalances is applied as described in Embodiment 1. The Doppler frequency components are translated to the relative velocity components based on the expression (29) to be shown.

When phase shifting to correct modulated code imbalances is not applied, as illustrated in FIGS. 5A and 5B, it is found that, in addition to the peak Doppler frequency component corresponding to −70 km/h, which is the travel velocity of the measurement target (in the direction away from the radar apparatus 10), another Doppler frequency component (Doppler peak) appears. When phase shifting to correct modulated code imbalances is not applied, as illustrated in FIGS. 5A and 5B, a false Doppler peak appears due to IQ errors, degrading the radar detection performance.

On the other hand, when phase shifting to correct modulated code imbalances is applied, as illustrated in FIGS. 6A and 6B, any false Doppler peak as shown in FIGS. 5A and 5B does not appears, and the peak Doppler frequency component corresponding to −70 km/h, which is the travel velocity of the measurement target, is correctly detected. It is therefore confirmed that according to Embodiment 1, the degradation of the radar performance that can cause false detection does not occur even under the conditions where the reception radio unit 202 includes IQ errors.

As described above, the radar apparatus 10 includes: the radar transmission signal generator 101, which generates a radar transmission signals composed of transmission codes with each sub-pulse given a predetermined phase shift; and the transmission radio unit 106, which transmits the radar transmission signals in each predetermined transmission cycle. The radar apparatus 10 further includes: the imbalance detector 104, which detects the modulated code imbalance of each transmission code; the phase shifter 105, which gives to each transmission code, a phase shift (a first phase shift) to correct the detected modulated code imbalance; and the opposite phase shifter 206, which gives a second phase shift, which is in an opposite direction to the first phase shift, to a reflection wave signal which is a reflection of the radar transmission signal on the target.

By the operations of the imbalance detector 104, phase shifter 105, and opposite phase shifter 206, the radar apparatus 10 applies phase shifting to the transmission codes of the code length L so that the modulated code imbalances are equalized in the four quadrants of the IQ plane. In the radar apparatus 10, the modulated code imbalances, each of which is an imbalance between the positions where the plural sub-pulses constituting each transmission code included in the radar transmission signal transmitted in each transmission cycle are mapped on the IQ plane, are included in all of the four quadrants of the IQ plane for a predetermined number of transmission cycles.

In the radar apparatus 10, even when the reception ratio unit 202 (a quadrature demodulator) includes IQ errors, the IQ errors are smoothed. Accordingly, it is possible to prevent a false Doppler peak due to IQ errors from appearing in the outputs of the Doppler analyzer 208, so that the degradation of the radar detection performance is suppressed. According to Embodiment 1, it is possible to suppress degradation of the radar detection performance due to circuit errors.

Moreover, according to Embodiment 1, the radar apparatus 10 reduces the influence of IQ errors generated in the reception radio unit 202 by applying phase shifting to correct modulated code imbalances. It is therefore unnecessary to provide a circuit to detect or correct IQ errors. According to Embodiment 1, the radar apparatus 10 is able to prevent a false Doppler peak from appearing due to IQ errors, with a simple configuration.

According to Embodiment 1, as described above, it is possible to suppress degradation of the radar detection performance with a simple configuration without adding a highly-precise correction circuit to correct circuit errors even if the quadrature demodulator includes IQ errors.

In FIG. 1, the opposite phase shifter 206 of the radar apparatus 10 is provided after the correlation calculator 205. As illustrated in FIG. 7, the opposite phase shifter 206 may be provided before the correlation calculator 205. This configuration provides the same effects as that of Embodiment 1.

Embodiment 2

Figure 8:
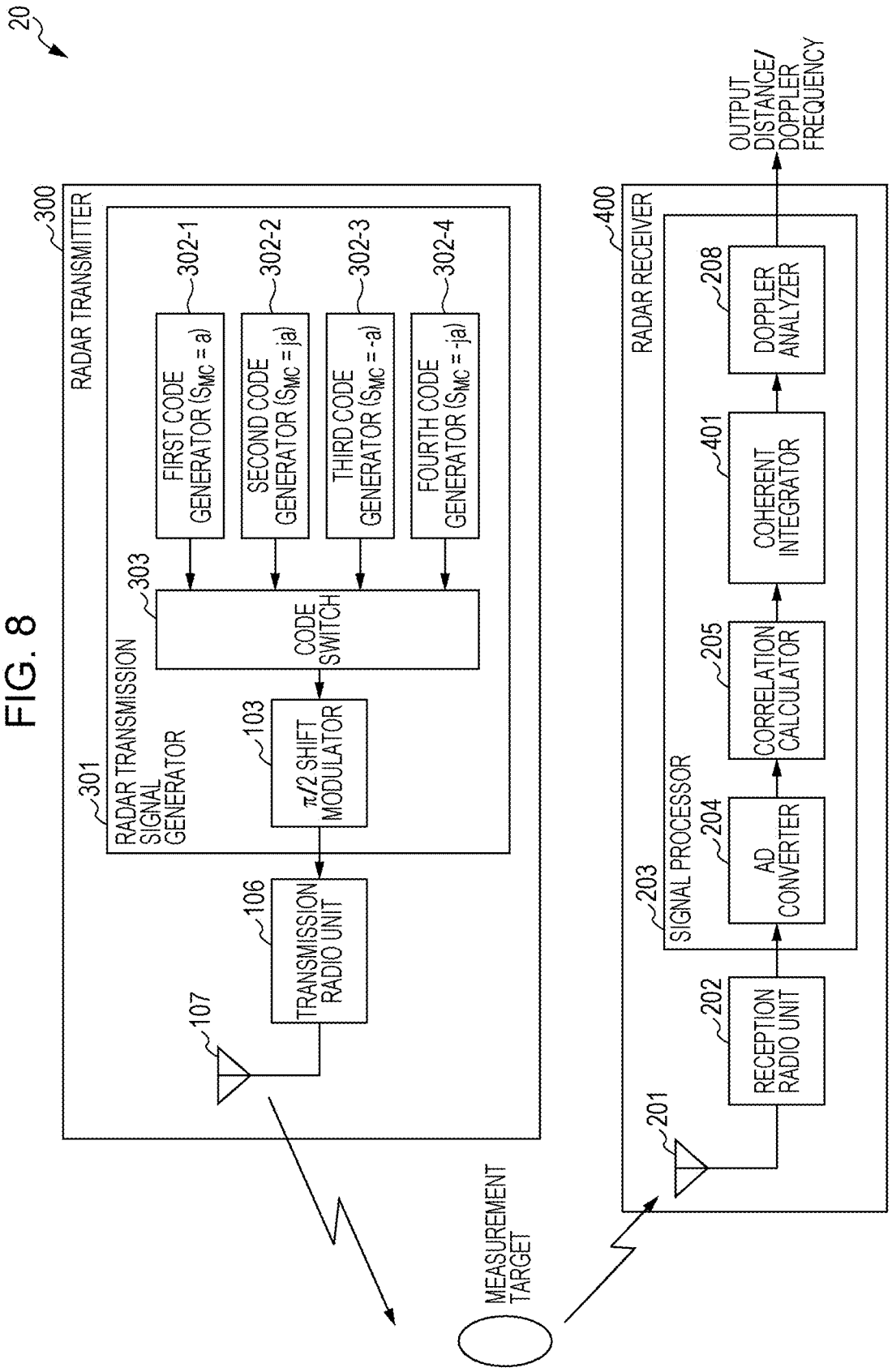
FIG. 8 is a block diagram illustrating a configuration example of a radar apparatus according to Embodiment 2 of the disclosure.

FIG. 8 is a block diagram illustrating a configuration example of a radar apparatus 20 according to Embodiment 2. In FIG. 8, the same components as those of the radar apparatus 10 (FIG. 1) according to Embodiment 1 are given the same reference numerals, and the description thereof is omitted.

Specifically, the radar apparatus 20 illustrated in FIG. 8 includes a radar transmitter 300 and a radar receiver 400. In Embodiment 1, the radar transmitter 100 (FIG. 1) detects modulated code imbalances and applies phase shifting to correct modulated code imbalances to the modulated codes. On the other hand, the radar transmitter 300 according to Embodiment 2 previously selects at least four codes the modulated code imbalances SMC of which after π/2 shift modulation by the π/2 shift modulator 103 are located in the different quadrants (four quadrants) of the IQ plane. The radar transmitter 300 then sequentially transmits the selected codes every radar transmission cycle while switching them from one to another.

The radar receiver 400 according to Embodiment 2 does not include the opposite phase shifter 206.

Specifically, the radar transmission signal generator 301 of the radar transmitter 300 includes a first code generator 302-1, a second code generator 302-2, a third code generator 302-3, a fourth code generator 302-4, a code switch 303, and the π/2 shift modulator 103.

The first to fourth code generators 302-1 to 302-4 previously select codes the modulated code imbalances $S_{MC}$ of which after π/2 shift modulation are respectively a, ja, −a, and −ja, that are located in different quadrants of the IQ plane. Herein, a is a constant, and j is the imaginary unit.

The code switch 303 sequentially and cyclically switches the output of the code generators in the order from the first to fourth code generators 302-1 to 302-4 every radar transmission cycle. For example, in the radar transmission cycles following the completion of the output from the fourth code generator 302-4, the code switch 303 again sequentially switches the outputs of the first to fourth code generators 302-1 to 302-4 in this order.

When the transmission codes are complementary codes, the radar transmission signal generator 301 may include eight code generators 302, (first, second, . . . , and eighth code generators 302-1 to 302-8 (not illustrated)), for example. Specifically, the first and second code generators 302-1 and 302-2 previously select codes constituting a complementary code pair. The same applies to the third and fourth code generators 302-3 and 302-4, the fifth and sixth code generators 302-5 and 302-6, and the seventh and eighth code generators 302-7 and 302-8.

For example, the first and second code generators 302-1 and 302-2 previously select codes the modulated code imbalances SMC of which after π/2 shift modulation are a.

For example, the third and fourth code generators 302-3 and 302-4 previously select codes the modulated code imbalances SMC of which after π/2 shift modulation are ja.

For example, the fifth and sixth code generators 302-5 and 302-6 previously select codes the modulated code imbalances SMC of which after π/2 shift modulation are −a.

For example, the seventh and eighth code generators 302-7 and 302-8 previously select codes the modulated code imbalances SMC of which after π/2 shift modulation are −ja.

Herein, a is a constant.

The code switch 303 sequentially and cyclically switches to one of the outputs from the first to eighth code generators 302-1 to 302-8 every radar transmission cycle.

The transmission codes sequentially outputted from the code switch 303 are subjected to π/2 shift modulation by the π/2 shift modulator 103.

Similarly to Embodiment 1, in the radar apparatus 20, the modulated code imbalances SMC of the transmission codes included in the radar transmission signals transmitted in the respective transmission cycles are included in all of the four quadrants of the IQ plane in the predetermined number of transmission cycles.

On the other hand, the coherent integrator 401 of the radar receiver 400 uses correlation values AC(k, m) outputted from the correlation calculator 205 at each discrete time k (see the expression (24), for example) to add the correlation values AC(k, m) at each discrete time k in a predetermined number $N_e$ of radar transmission cycles for calculation of coherent integral values ACC(k, v) at each discrete time k. Herein, k=1, . . . , $N_v$.

Specifically, the v-th coherent integral value ACC(k, v) is calculated as the following expression (30).

$$ACC(k, v) = \sum_{m=1}^{Ne} AC(k, N_e(v-1)+m) \qquad (30)$$

Herein, the predetermined number $N_e$ is set to a multiple of 4. When the transmission codes are complementary codes, the predetermined number $N_e$ is set to a multiple of 8.

As described above, in Embodiment 2, the radar apparatus 20 previously selects codes the modulated code imbalances of which after π/2 shift modulation are equalized in the four quadrants of the IQ plane.

Accordingly, even if the reception ration unit 202 includes IQ errors, the radar apparatus 20 adds the reception signals included in the respective four quadrants of the IQ plane to smooth the IQ errors. According to Embodiment 2, similarly to Embodiment 1, it is possible to suppress degradation of the radar detection performance due to amplitude and phase errors in the IQ plane.

In Embodiment 2, moreover, the process to detect modulated code imbalances and phase shifting and opposite phase shifting to correct modulated code imbalances are unnecessary. It is therefore possible to suppress degradation of the radar detection performance with a simple configuration.

Embodiment 3

In Embodiment 3, a description is given of the configuration of a multiple-input-multiple-output (MIMO) radar using plural transmitting and receiving antennas.

Figure 9:
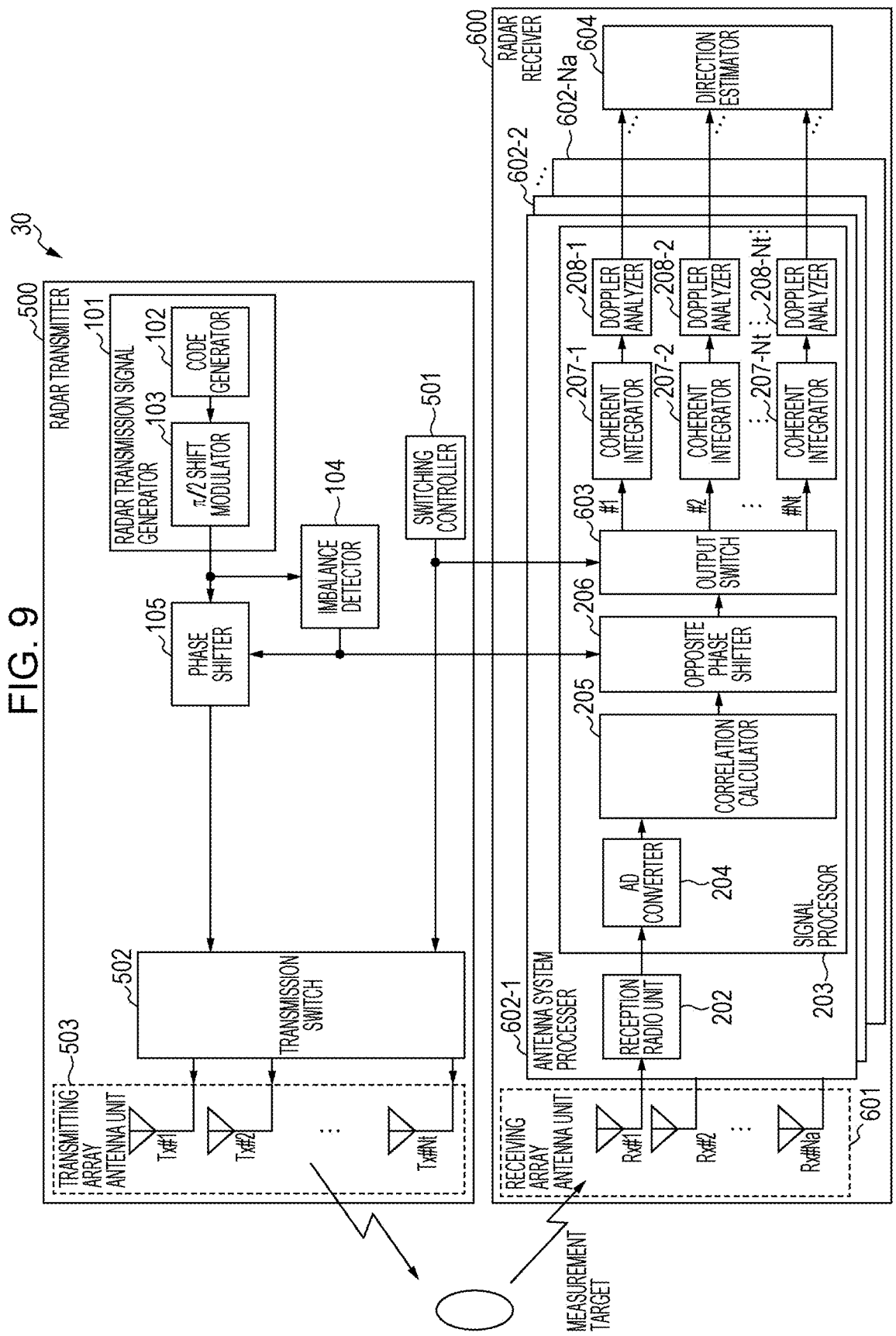
FIG. 9 is a block diagram illustrating a configuration example of a radar apparatus according to Embodiment 3 of the disclosure.

FIG. 9 is a block diagram illustrating a configuration example of a radar apparatus 30 according to Embodiment 3. In FIG. 9, the same components as those of Embodiment 1 (FIG. 1) are given the same reference numerals, and the description thereof is omitted.

The radar apparatus 30 illustrated in FIG. 9 has a time-division MIMO radar configuration which transmits time-division multiplexed different radar transmission signals switching to one of the plural transmission antennas in a time-division manner and separates each radar transmission signal for reception processing. The configuration of the radar apparatus is not limited thereto. The radar apparatus 30 may be configured to transmit different frequency-division multiplexed or code-division multiplexed transmission signals (described later) through plural transmission antennas and separates each transmission signal for reception processing. [Configuration of Radar Transmitter 500]

A radar transmitter 500 of the radar apparatus 30 includes the radar transmission signal generator 101, the imbalance detector 104, the phase shifter 105, a switching controller 501, a transmission switch 502, and a transmitting array antenna unit 503.

The transmitting array antenna unit 503 includes Nt transmitting antennas (Tx#1 to Tx#Nt).

The switching controller 501 outputs a control signal (hereinafter, referred to as a switching control signal) indicating a time to change the transmitting antennas (Tx#1 to Tx#Nt) of the transmitting array antenna unit 503 (or instructing selection of the output of the radar transmission signal) to the transmission switch 502 and radar receiver 600 (the correlation calculator 205 and an output switch 603).

The transmission switch 502 selects one of the Nt transmitting antennas of the transmitting array antenna unit 503 based on the switching control signal from the switching controller 501 to input the output signal from the phase shifter 105 to the selected transmitting antenna. The transmission switch 502 applies frequency conversion to the output signal (baseband radar transmission signal) from the phase shifter 105 into a predetermine radio frequency and outputs the radio frequency signal to the selected (connected) transmitting antenna.

The transmitting array antenna unit 503 radiates the radar transmission signal outputted from the transmission switch 502 from the transmitting antenna selected by (connected to) the transmission switch 502 into space.

Hereinafter, a description is given of an operation of the switching controller 501 to control the transmission switch 502. The operation of the switching controller 501 to control the radar receiver 600 is described later in the description of the operation of the radar receiver 600.

The switching controller 501 outputs to the transmission switch 502, the switching control signal to sequentially switch to one of the transmitting antennas of the transmitting array antenna unit 503 every $N_e$ radar transmission cycles.

The predetermined number $N_e$ is set to a multiple of 4. When the transmission codes are complementary codes, the predetermined number $N_e$ is set to a multiple of 8. Even if the reception radio unit 202 includes IQ errors, the IQ errors can be smoothed by one or several additions for the reception signals included in the four quadrants as a unit by the coherent integrator 207. This suppresses degradation of the radar performance due to amplitude and phase errors in the IQ plane.

For example, the switching controller 501 causes the transmitting antenna (Tx#1) of the transmitting array antenna unit 503 to output the output signal (the converted high-frequency signal) from the radar transmission signal generator 101 in the first $N_e$ radar transmission cycles ($N_e \times T_r$).

The switching controller 501 causes the transmitting antenna (Tx#2) of the transmitting array antenna unit 503 to output the output signal (the converted high-frequency signal) from the radar transmission signal generator 101 in the next $N_e$ radar transmission cycles ($N_e \times T_r$).

The switching controller 501 repeats the same operation and causes the transmitting antenna (Tx#Nt) of the transmitting array antenna unit 503 to output the output signal (the converted high-frequency signal) from the radar transmission signal generator 101.

The switching controller 501 again causes the transmitting antenna (Tx#1) of the transmitting array antenna unit 503 to output the output signal (the converted high-frequency signal) from the radar transmission signal generator 101 in the next $N_e$ radar transmission cycles ($N_e \times T_r$).

The switching controller 501 repeats the aforementioned operation for a predetermined number of times ($N_d \times N_t$).

[Configuration of Radar Receiver 600]

The radar receiver 600 of the radar apparatus 30 includes a receiving array antenna unit 601, an antenna system processor 602, and a direction estimator 604.

The receiving array antenna unit 601 includes Na receiving antennas (Rx#1 to Rx#Na). The Na receiving antennas individually receive signals (reflection wave signals) which are reflections of the radar transmission signal transmitted from the radar transmitter 500 on reflective objects including a radar measurement target. The signals received by the Na receiving antennas are inputted to the respective antenna system processors 602 corresponding to the receiving antennas (Rx#1 to Rx#Na) as reception signals.

Each of the antenna system processors 602 includes the reception radio unit 202 and the signal processor 203.

The reception radio unit 202 of the z-th antenna system processor 602-z amplifies the reception signal from the z-th receiving antenna (Rx#z) to a predetermined level and performs frequency-conversion for the high-frequency reception signal into a baseband reception signal. The z-th reception radio unit 202 then converts the baseband reception signal to the baseband reception signal including I and Q signals. Herein, $z=1, \ldots, Na$.

The signal processor 203 of the z-th antenna system processor 602-z includes the AD converter 204, the correlation calculator 205, the opposite phase shifter 206, an output switch 603, the coherent integrators 207, and the Doppler analyzers 208. The signal processor 203 includes Nt coherent integrators 207 and Nt Doppler analyzers 208 corresponding to the transmitting antennas (Tx#1 to Tx#Nt).

Hereinafter, a description is given of each component of the signal processor 203 of the z-th antenna system processor 602-z, mainly operations different from those of Embodiment 1.

The correlation calculator 205 calculates correlation between the complex baseband signals $X(N_v(m-1)+k)$ outputted from the AD converter 204 (see the expression (23), for example) and the transmission codes generated by the radar transmission signal generator 101 every $N_e$ radar transmission cycles ($N_e \times T_r$).

Every $N_e$ radar transmission cycles ($N_e \times T_r$), the opposite phase shifter 206 applies to the signals (correlation values) outputted from the correlation calculator 205, phase shifting which is in the opposite direction to (that cancels) phase shifting to correct the modulated code imbalances detected by the imbalance detector 104.

The output switch 603 switches to one of the coherent integrators 207-1 to 207-Nt corresponding to the transmission antenna number (#1 to #Nt) selected every $N_e$ radar transmission cycles ($N_e \times T_r$) by the switching controller 501.

When the transmitting antenna (Tx#1) is selected by the switching controller 501, for example, the output switch 603 outputs the signal from the opposite phase shifter 206 to the coherent integrator 207-1 corresponding to the transmitting antenna (Tx#1).

When the transmitting antenna (Tx#2) is selected by the switching controller 501, the output switch 603 outputs the signal from the opposite phase shifter 206 to the coherent integrator 207-2 corresponding to the transmitting antenna (Tx#2).

The output switch 603 repeats the same operation and, when the transmitting antenna (Tx#Nt) is selected by the switching controller 501, outputs the signal from the opposite phase shifter 206 to the coherent integrator 207-Nt corresponding to the transmitting antenna (Tx#Nt).

For unit period defined by a plurality ($N_e$) of radar transmission cycles ($=N_e \times T_r$), the $N_D$-th coherent integrator 207-$N_D$ performs coherent integration for the outputs of the opposite phase shifter 206 selected by the switching controller 501 every $N_e$ radar transmission cycle ($N_e \times T_r$). Herein, $N_D=1, \ldots, Nt$.

Each of the Doppler analyzers 208 performs a Doppler frequency analysis for the output signals from the corresponding coherent integrator 207. The Doppler analyzer 208 performs a Doppler frequency analysis using the $N_d$ outputs from the coherent integrator 207 obtained at each discrete time k, with of the discrete time k in synchronization.

In the following description, w-th outputs $FT\_CI_{(Z)}^{(1)}(k, fs, w), \ldots, FT\_CI_{(Z)}^{(Na)}(k, fs, w)$ from the Doppler analyzers 208 at each discrete time k, which are obtained by the same processing in the antenna system processors 602-1 to 602-Na, are collectively represented as a virtual reception array correlation vector h(k, fs, w) shown in the following expressions (31) and (32). The virtual reception array correlation vector h(k, fs, w) includes Nt×Na (a product of the number Nt of transmitting antennas and the number Na of receiving antennas) elements. The virtual reception array correlation vector h(k, fs, w) is used to describe the process to perform direction estimation based on phase differences in reflection wave signals from the target between the receiving antennas. Herein, $z=1, \ldots, Nt$, and $N_D=1, \ldots, Na$. $f_s=-N_f+1, \ldots, 0, \ldots, N_f$.

$$h(k, fs, w) = \begin{bmatrix} FT\_CI_1^{(1)}(k, fs, w) \\ FT\_CI_2^{(1)}(k, fs, w) \\ \vdots \\ FT\_CI_{Na}^{(1)}(k, fs, w) \\ FT\_CI_1^{(2)}(k, fs, w) \\ FT\_CI_2^{(2)}(k, fs, w) \\ \vdots \\ FT\_CI_{Na}^{(2)}(k, fs, w) \\ \vdots \\ FT\_CI_1^{(Nt)}(k, fs, w) \\ FT\_CI_2^{(Nt)}(k, fs, w) \\ \vdots \\ FT\_CI_{Na}^{(Nt)}(k, fs, w) \end{bmatrix} = \begin{bmatrix} h^1(k, fs, w) \\ h^2(k, fs, w) \\ \vdots \\ h^{Nt}(k, fs, w) \end{bmatrix} \quad (31)$$

$$h^{ND}(k, fs, w) = \begin{bmatrix} FT\_CI_1^{(ND)}(k, fs, w) \\ FT\_CI_2^{(ND)}(k, fs, w) \\ \vdots \\ FT\_CI_{Na}^{(ND)}(k, fs, w) \end{bmatrix} \quad (32)$$

Hereinabove, the processing in each component of the signal processor 203 of the antenna system processor 602-z is described.

The direction estimator 604 multiplies the w-th virtual array correlation vector h(k, fs, w) at each discrete time k from the Doppler analyzers 208 of the antenna system processors 602-1 to 602-Na, by array correction values h_cal$_{[b]}$ to correct phase and amplitude deviations between the transmitting antennas of the transmitting array antenna unit 503 and between the receiving antennas of the receiving array antenna unit 601, to calculate a virtual receiving array correlation vector h$_{\_after\_cal}$(k, fs, w) with the inter-antenna deviations corrected. The virtual receiving array correlation vector h__after_cal (k, fs, w) is represented by the following expression (33). b=1, . . . , (Nt×Na).

$$h\_after\_cal(k, fs, w) = CAh(k, fs, w) = \begin{bmatrix} h_1(k, fs, w) \\ h_2(k, fs, w) \\ \vdots \\ h_{Na \times Nr}(k, fs, w) \end{bmatrix} \quad (33)$$

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

The virtual receiving array correlation vector h__after_cal (k, fs, w) with the inter-antenna deviations corrected is a column vector composed of Na×$N_r$ elements. Hereinafter, each element of the virtual receiving array correlation vector h__after_cal (k, fs, w) is represented as $h_1$(k, fs, w), . . . , $h_{Na \times Nr}$(k, fs, w) to be used in description of the direction estimation process.

The direction estimator 604 uses the virtual receiving array correlation vector h__after_cal (k, fs, w) to perform the direction estimation process based on the phase difference in reflection wave signals between the receiving antennas.

The direction estimator 604 calculates a spatial profile by varying the azimuth direction θ within a predetermined angular range in a direction estimation evaluation function value $P_H$(θ, k, fs, w). The direction estimator 604 extracts a predetermined number of the largest local peaks in the calculated spatial profile and determines the azimuth directions of the extracted local peaks as the direction-of-arrival estimation values.

The evaluation function value $P_H$(θ, k, fs, w) depends on the DOA estimation algorithm. For example, the evaluation function value $P_H$(θ, k, fs, w) may be based on the estimation method using an array antenna disclosed in "Direction-of-arrival estimation using signal subspace modeling Cadzow, J. A.; Aerospace and Electronic Systems, IEEE Transactions on Volume: 28, Issue: 1 Publication Year: 1992, Page(s): 64-79)".

For example, the beam former algorithm is represented by the following expressions (34) and (35). Other algorithms, such as Capon and MUSIC, are also applicable.

$$P_H(\theta_u, k, fs, w) = |a_H(\theta_u)^H h_{VAH}(k, fs, w)|^2 \quad (34)$$

$$a_H(\theta_u) = \begin{bmatrix} 1 \\ \exp\{-j2\pi d_H \sin\theta_u/\lambda\} \\ \vdots \\ \exp\{-j2\pi(N_{VAH}-1)d_H \sin\theta_u/\lambda\} \end{bmatrix} \quad (35)$$

Herein, the superscript H is the Hermitian transpose operator. $a_H(\theta_u)$ indicates the direction vector of the virtual receiving array with respect to the arriving waves in the azimuth direction $\theta_u$. $\theta_u$ is varied at a predetermined azimuth interval $\beta_1$ within the range of azimuth for the direction-of-arrival estimation. For example, $\theta_u$ is set as follows.

$\theta_u$=θmin+$u\beta_1$, u=0, . . . , NU

NU=floor[(θmax−θmin)/$\beta_1$]+1

Herein, the floor(x) is a function to return the greatest integer not exceeding a real value x.

Hereinabove, the configuration of the radar receiver 600 is described.

As described above, in Embodiment 3, when the radar apparatus 30, which is an MIMO radar, is configured to transmit radar transmission signals while switching over the plural transmitting antennas, the predetermined number Ne is set to a multiple of 4 (set to a multiple of 8 when the transmission codes are complementary codes) so that the reception signals located in the four quadrants of the IQ plane constitute a single unit. The radar apparatus 30 (the transmission switch 502) sequentially switches to one of the plural transmitting antennas of the transmission array antenna unit 503 the transmitting antenna to transmit the radar transmission signals, every period ($N_e \times T_r$) corresponding to the predetermined number Ne of transmission cycles.

According to Embodiment 3, similarly to Embodiment 1, even if the reception radio unit 202 includes IQ errors, the IQ errors can be smoothed by one or several additions for the reception signals. This can suppress degradation of the radar performance due to amplitude and phase errors in the IQ plane.

Figure 10:
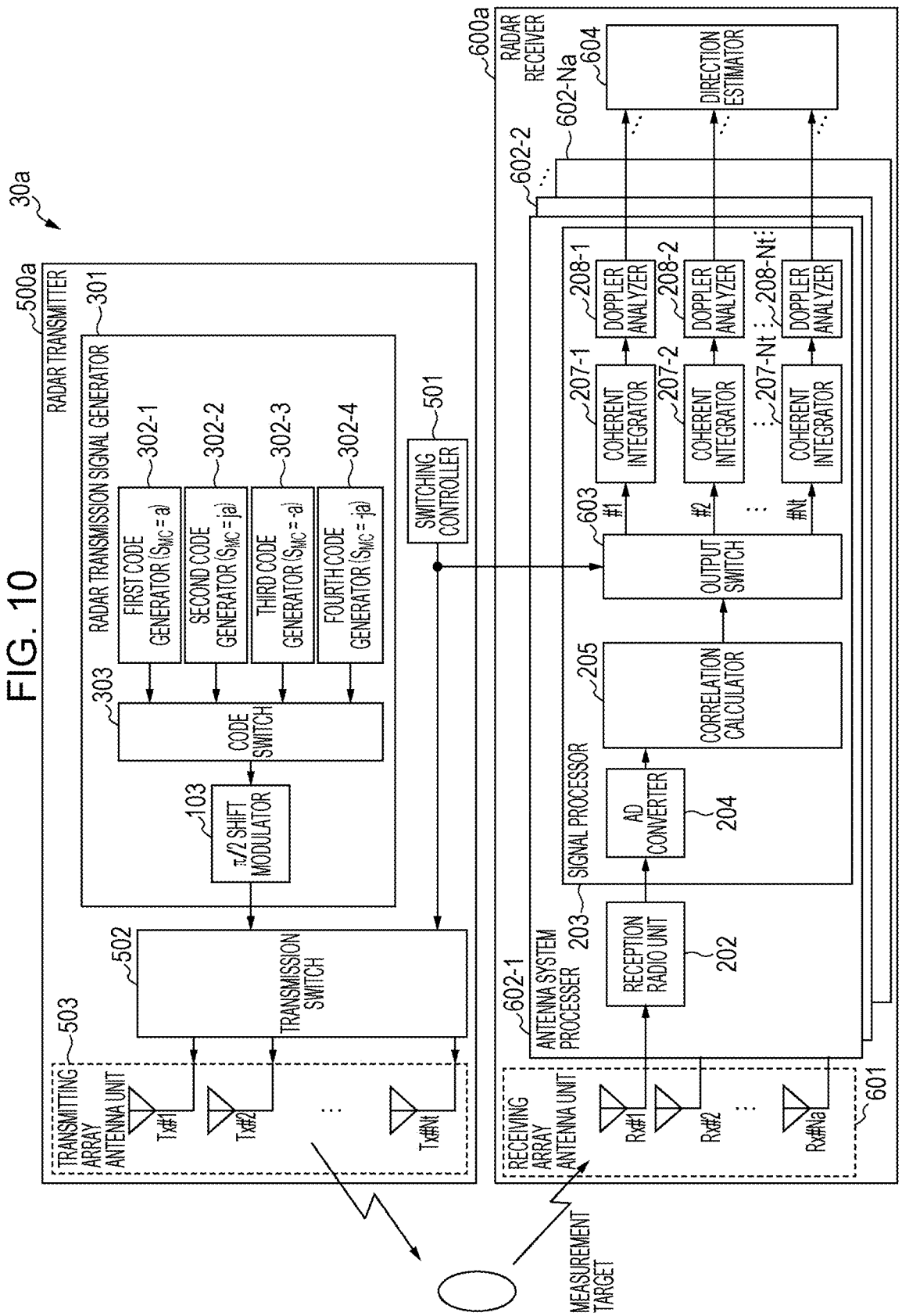
FIG. 10 is a block diagram illustrating another configuration example of the radar apparatus according to Embodiment 3 of the disclosure.

Embodiment 3 describes the configuration in which the radar apparatus 30 illustrated in FIG. 9 applies phase shifting to correct modulated code imbalances similarly to Embodiment 1. However, Embodiment 3 is not limited to this configuration. For example, in Embodiment 3, a radar apparatus 30a, which is a time-division MIMO radar, may include a configuration to previously select codes the modulated code imbalances of which after π/2 shift modulation are located evenly in the four quadrants of the IQ plane in a similar manner to Embodiment 2 as illustrated in FIG. 10. Also in the radar apparatus 30a illustrated in FIG. 10, the predetermined number $N_e$ at transmitting radar transmission signals while switching over the plural transmitting antennas is set to a multiple of 4 (set to a multiple of 8 when the transmission codes are complementary codes) so that the reception signals located in the four quadrants of the IQ plane constitutes a single unit.

Embodiment 4

Embodiment 3 describes the MIMO radar that transmits different time-division multiplexed radar transmission signals while Embodiment 4 gives a description of a configuration of an MIMO radar that transmits different code-division multiplexed radar transmission signals.

Figure 11:
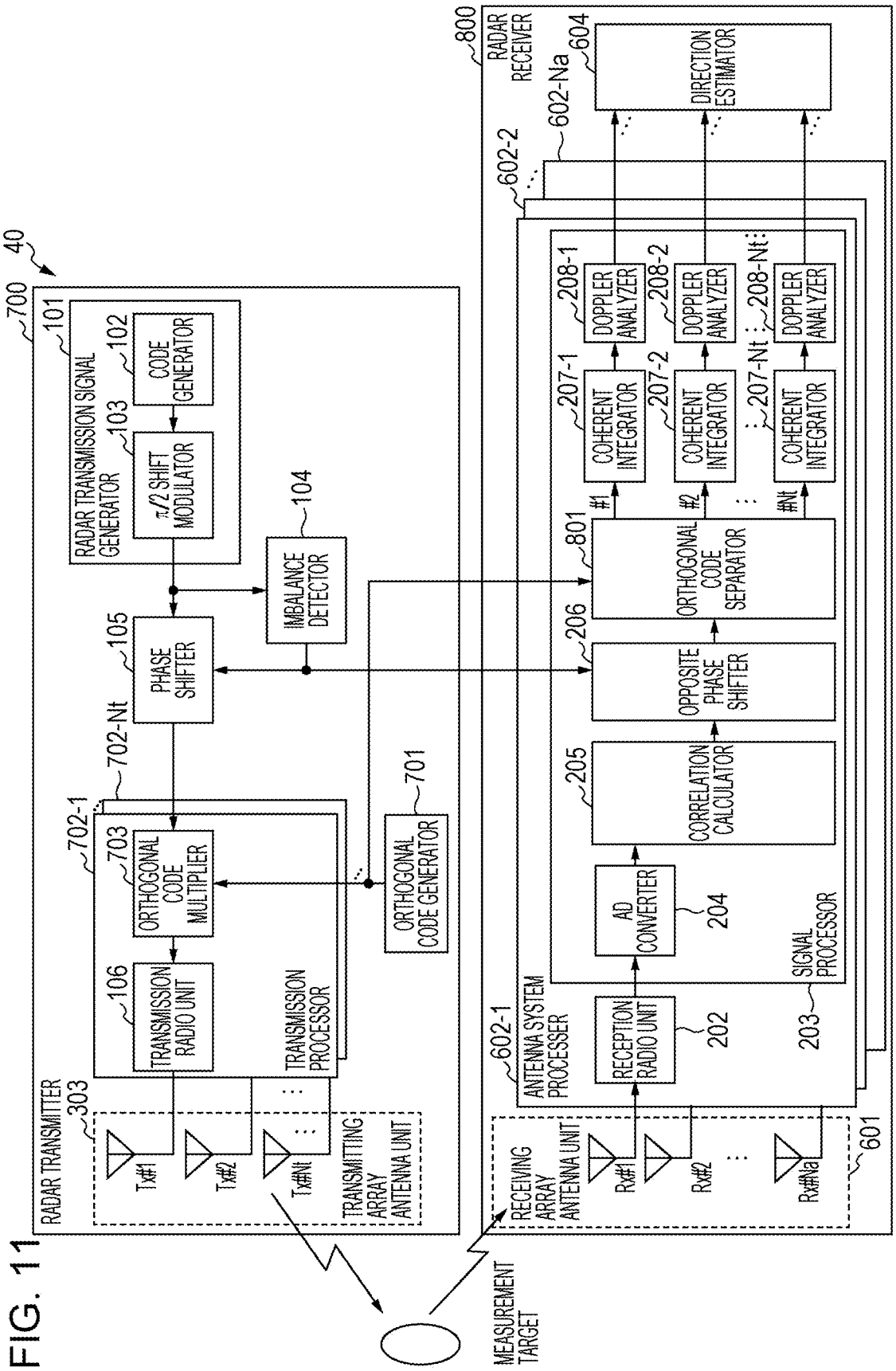
FIG. 11 is a block diagram illustrating a configuration example of a radar apparatus according to Embodiment 4 of the disclosure.

FIG. 11 is a block diagram illustrating a configuration example of a radar apparatus 40 according to Embodiment 4. In FIG. 11, the same components as those of Embodiment 1 (FIG. 1) or Embodiment 3 (FIG. 9) are given the same reference numerals, and the description thereof is omitted.

The radar apparatus 40 illustrated in FIG. 11 has a code-division MIMO radar configuration which, using orthogonal codes, transmits different code-division multiplexed radar transmission signals from the transmission antennas and separates each radar transmission signal for reception processing.

[Configuration of Radar Transmitter 700]

A radar transmitter 700 of the radar apparatus 40 includes the radar transmission signal generator 101, the imbalance detector 104, the phase shifter 105, an orthogonal code generator 701, and transmission processors 702.

The orthogonal code generator 701 generates Nt orthogonal codes orthogonal to each other. The orthogonal codes may be Walsh-Hadamard codes or M-sequence codes. Herein, the orthogonal code used in the radar transmission signal to be transmitted from the g-th transmitting antenna among the Nt transmitting antennas is represented by an orthogonal code $OC^{(g)}$. The orthogonal code $OC^{(g)}$ has a code length Loc and includes elements of $\{OC_1^{(g)}, OC_2^{(g)}, \ldots, OC_{Loc}^{(g)}\}$. Herein, $g=1, \ldots, Nt$. The length Loc of the orthogonal codes is set to a power of 2 not less than $2^{ceil(log_2(Nt))}$. Herein, ceil(x) indicates an operator that outputs the least integer not less than x.

The transmission processors 702 are provided corresponding to the respective transmission antennas (Tx#1 to Tx#Nt) of the transmission array antenna unit 503. Each of the transmission processors 702 includes an orthogonal code multiplier 703 and the transmission radio unit 106.

The orthogonal code multiplier 703 multiplies the outputs of the phase shifter 105 every Noc radar transmission cycles by the corresponding orthogonal code element outputted from the orthogonal code generator 701 and outputs the result.

The orthogonal code multiplier 703 of the g-th transmission processor 702-g multiplies Noc outputs of the phase shifter 105 from the first to Noc-th outputs (m=1, . . . , Noc) by the first orthogonal code element $OC_1^{(g)}$ as shown in the following expression (36) and outputs the result.

$$OC_1^{(g)} \exp[j PhaseRot(m)] G(N_r(m-1)+k_s) \quad (36)$$

The orthogonal code multiplier 703 of the g-th transmission processor 702-g then multiplies the subsequent Noc outputs of the phase shifter 105, from the (Noc+1)th to 2Noc-th outputs (m=Noc+1, . . . , 2Noc), by the second orthogonal code element $OC_2^{(g)}$ as shown in the following expression (37) and outputs the result.

$$OC_2^{(g)} \exp[j PhaseRot(m)] G(N_r(m-1)+k_s) \quad (37)$$

In a similar manner, the orthogonal code multiplier 703 of the g-th transmission processor 702-g multiplies Noc outputs of the phase shifter 105, from the ((Loc−1)×Noc+1)-th to (Loc×Noc)-th outputs (m=(Loc−1)×Noc+1, . . . , Loc× Noc), by the Loc-th orthogonal code element $OC_{Loc}^{(g)}$ as shown in the following expression (38) and outputs the result.

$$OC_{Loc}^{(g)} \exp[j PhaseRot(m)] G(N_r(m-1)+k_s) \quad (38)$$

After the multiplication of the Loc-th orthogonal code element $OC_{LOC}^{(g)}$, the orthogonal code multiplier 703 of the g-th transmission processor 702-g cyclically calls the orthogonal code elements from $OC_1^{(g)}$ for multiplication. Specifically, the orthogonal code multiplier 703 of the g-th transmission processor 702-g multiplies the subsequent outputs of the phase shifter 105 from the ((Loc×Noc)+1)-th to ((Loc+1)×Noc)-th outputs (m=Loc×Noc+1, . . . , (Loc+1)× Noc) by the first orthogonal code element $OC_1^{(g)}$ and outputs the result. The orthogonal code multiplier 703 then repeats the same operation.

In the radar transmitter 700, the predetermined number Noc is set to a multiple of 4. When the transmission codes are complementary codes, the predetermined number Noc is set to a multiple of 8. Specifically, the transmission processor 702-g (g=1 to Nt) switches an orthogonal code element to be multiplied by the radar transmission signal among the plural orthogonal code elements $OC_{Loc}^{(g)}$ constituting the orthogonal code $OC^{(g)}$ at each period ($N_{LOC} \times T_r$) corresponding to the predetermined number Noc of transmission cycles.

Even if the reception radio unit 202 includes IQ errors, the IQ errors can be smoothed by one or several additions of the reception signals that are included in the four quadrants of the IQ plane as a unit, in each coherent integrator 207. This can suppress degradation of the radar performance due to amplitude and phase errors in the IQ plane.

[Configuration of Rader Receiver 800]

The radar receiver 800 of the radar apparatus 40 includes the receiving array antenna unit 601, antenna system processors 602, and direction estimator 604.

The signal processor 203 of the z-th antenna system processor 602-z includes the A/D converter 204, the correlation calculator 205, the opposite phase shifter 206, an orthogonal code separator 801, the coherent integrators 207, and the Doppler analyzers 208.

The orthogonal code separator 801 of the signal processor 203 of the z-th antenna system processor 602-z multiplies outputs $ACP_z(k,m)$ of the opposite phase shifter 206 (see the expression (25)) by the same code elements as those multiplied in the orthogonal code multiplier 703 at each period (Noc×Tr) corresponding to the predetermined number Noc of transmission cycles, to separate the code-division multiplexed radar transmission signals transmitted through the Nt transmission antennas.

In order to extract the code-division multiplexed radar transmission signals transmitted from the g-th transmitting antenna, the orthogonal code separator 801 multiplies the first orthogonal code element $OC_1^{(g)}$ by the first to Noc-th outputs $ACP_z(k, m)$ of the opposite phase shifter 206 and outputs the result as $OC\_ACP_z^{(g)}(k, m)$ as shown in the following expression (39).

$$OC\_ACP_z^{(g)}(k, m) = OC_1^{(g)} \times ACP_z(k, m) \quad (39)$$

In order to extract the code-division multiplexed radar transmission signals transmitted from the g-th transmitting antenna, the orthogonal code separator 801 multiplies the second orthogonal code element $OC_2^{(g)}$ by the (Noc+1)-th to (2Noc)-th (m=Noc+1, . . . , 2Noc) outputs $ACP_z(k, m)$ of the opposite phase shifter 206 and outputs the result as $OC\_ACP_z^{(g)}(k, m)$ as shown in the following expression (40).

$$OC\_ACP^{(g)}(k, m) = OC_2^{(g)} \times ACP_z(k, m) \quad (40)$$

In a similar manner, the orthogonal code separator 801 multiplies the Loc-th orthogonal code element $OC_{LOC}^{(g)}$ by the ((Loc−1)×Noc+1)-th to (Loc×Noc)-th outputs $ACP_z(k, m)$ (m=(Loc−1)×Noc+1, . . . , Loc×Noc) of the opposite phase shifter 206 in order to extract the code-division multiplexed radar transmission signals transmitted from the g-th transmitting antenna and outputs the result as $OC\_ACP_z^{(g)}(k, m)$ as shown in the following expression (41).

$$OC\_ACP_z^{(g)}(k, m) = OC^{(g)} \times ACP_z(k, m) \quad (41)$$

After the multiplication of the Loc-th orthogonal code element $OC_{Loc}^{(g)}$, the orthogonal code separator 801 cyclically calls the orthogonal code elements from $OC_1^{(g)}$ for multiplication. Specifically, in order to extract the code-division multiplexed radar transmission signals transmitted from the g-th transmitting antenna, the orthogonal code separator 801 multiplies the first orthogonal code element $OC_1^{(g)}$ by the ((Loc×Noc)+1)-th to ((Loc+1)×Noc)-th outputs $ACP_z(k, m)$ (m=(Loc×Noc)+1, . . . , (Loc+1)×Noc) of the opposite phase shifter 206 and outputs the result as $OC\_ACP_z^{(g)}(k, m)$ as shown in the following expression (42). The orthogonal code separator 801 then repeats the same operations.

$$OC\_ACP_z^{(g)}(k, m) = OC_1^{(g)} \times ACP_z(k, m) \quad (42)$$

As described above, in Embodiment 4, when the radar apparatus 40, which is an MIMO radar, is configured to transmit code-division multiplexed radar transmission signals from the plural transmitting antennas, the predetermined number Noc is set to a multiple of 4 (set to a multiple of 8 when the transmission codes are complementary codes) so that the reception signals located in the four quadrants of the IQ plane constitute a unit. The radar apparatus 40 (the transmission processors 702) changes the orthogonal code element to be multiplied by the radar transmission signals to be transmitted though the plural transmitting antennas, every period (Noc×$T_r$) corresponding to the predetermined number Noc of transmission cycles.

According to Embodiment 4, similarly to Embodiment 1, even if the reception radio unit 202 includes IQ errors, the IQ errors can be smoothed by one or several additions for the reception signals. This can suppress degradation of the radar performance due to amplitude and phase errors in the IQ plane. According to Embodiment 4, it is therefore possible to suppress degradation of the radar performance due to amplitude and phase errors in the IQ plane.

Figure 12:
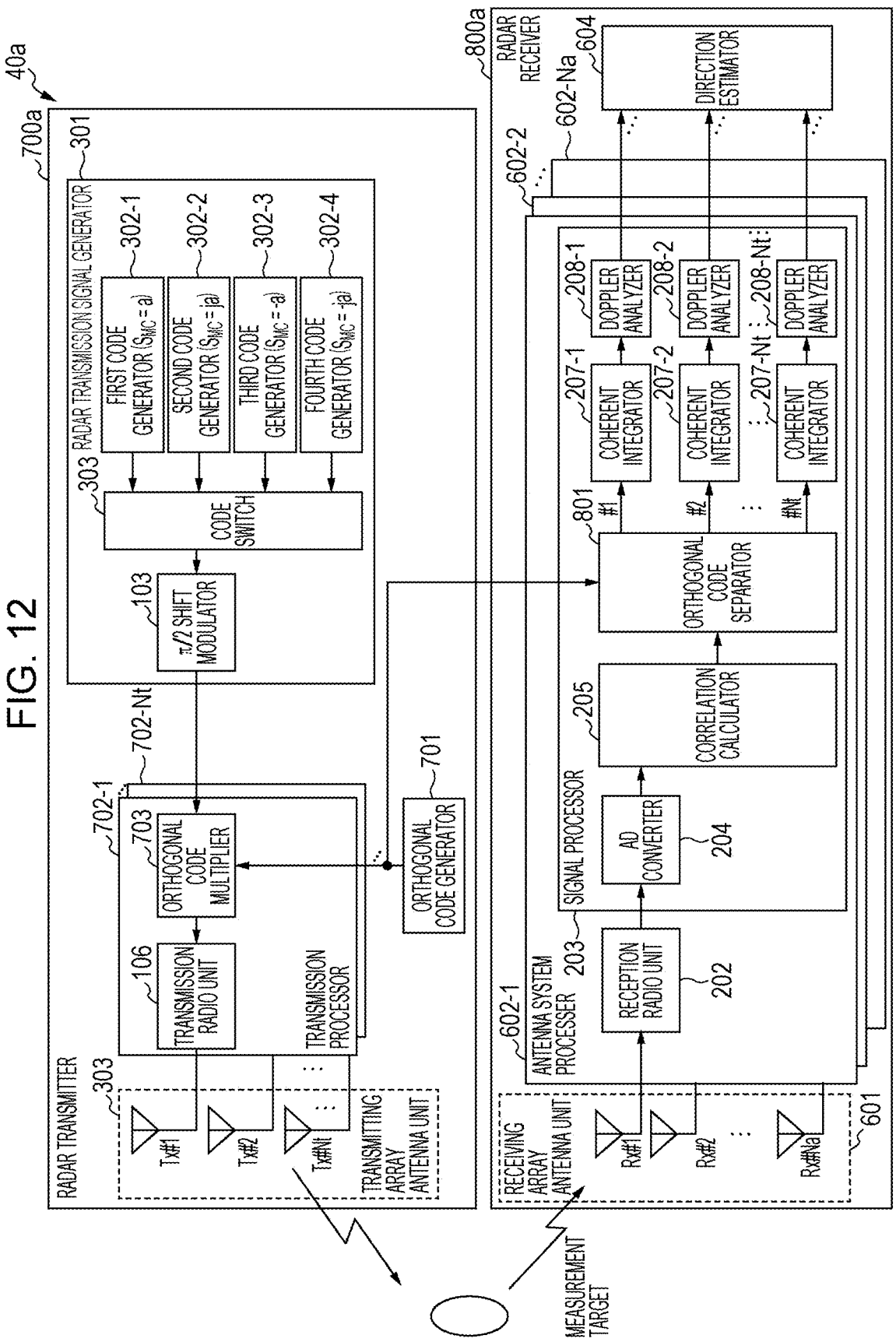
FIG. 12 is a block diagram illustrating another configuration example of the radar apparatus according to Embodiment 4 of the disclosure.

Embodiment 4 describes the configuration in which the radar apparatus 40 illustrated in FIG. 11 applies phase shifting to correct the modulated code imbalances similarly to Embodiment 1. However, Embodiment 4 is not limited to this configuration. For example, as illustrated in FIG. 12, a radar apparatus 40a according to Embodiment 4, which is a code-division MIMO radar, may include a configuration to previously select codes the modulated codes of which after π/2 shift modulation are located evenly in the four quadrants of the IQ plane in a similar manner to Embodiment 2. Also in the radar apparatus 40a illustrated in FIG. 12, the predetermined number Noc at transmitting radar transmission signals through plural transmitting antennas is set to a multiple of 4 (set to a multiple of 8 when the transmission codes are complementary codes) so that the reception signals located in the four quadrants of the IQ plane constitute a unit.

Hereinabove, the embodiments according to an aspect of the disclosure are described.

The operations of the aforementioned embodiments and variations thereof may be combined properly.

Other Embodiments (1) The aforementioned embodiments describe the cases of performing π/2 shift modulation. However, the modulation is not limited to π/2 shift modulation and only needs to give a predetermined phase shift to each sub-pulse (code element) constituting a transmission code. For example, using π/4 shift modulation or π/8 shift modulation can provide the same effects as those of the aforementioned embodiments.

When π/4 shift modulation is used instead of π/2 shift modulation, the radar transmission signal generator 101 applies a phase shift of π/4 to each of L elements ($C_1(m)$, $C_2(m)$, . . . , $C_L(m)$) of the transmission code Code(m) on a transmission code sub-pulse basis (on a transmission code element basis) to generate modulated code MC(m) as shown in expression (43).

$$MC_n(m)=\exp[j(n-1)\pi/4]C_n(m) \quad (43)$$

Herein, m=1, . . . , Q. j is the imaginary unit, and j=exp(jπ/2). The n-th element $C_n(m)$ of the transmission code Code(m) is mapped to the n-th element of the modulated code MC(m) by π/4 shift modulation as shown in the expression (43).

In the case of using π/4 shift modulation, at least 8 sub-pulses are necessary for a rotation of 2π on the IQ plane. The code length L of the transmission codes is preferably not less than 8.

In the case of using π/8 shift modulation, for example, the radar transmission signal generator 101 applies a phase shift of π/8 to L elements {$C_1(m)$, $C_2(m)$, . . . , $C_L(m)$} of the transmission code Code(m) on a transmission code sub-pulse basis (a transmission code element basis) as shown in the following expression (44) to generate the modulated code MC(m).

$$MC_n(m)=\exp[j(n-1)\pi/8]C_n(m) \quad (44)$$

Herein, m=1, . . . , Q. j is the imaginary unit, and j=exp(jπ/2). The n-th element $C_n(m)$ of the transmission code Code(m) is mapped to the n-th element of the modulated code MC(m) by π/8 shift modulation as shown in the expression (44).

In the case of using π/8 shift modulation, at least 16 sub-pulses are necessary for a rotation of 2π on the IQ plane. The code length L of the transmission codes is preferably not less than 16.

(2) In the description of the above embodiments, the elements $C_n(m)$ of the transmission code Code(m) generated by the code generator 102 are binary phase codes composed of two values of −1 or 1. However, the elements Cn(m) are not limited to the binary phase codes. The elements $C_n(m)$ of the transmission code Code(m) may be quadriphase codes or poly-phase codes such as Frank codes, P1 codes, P2 codes, P3 codes, and P4 codes, for example.

When the transmission codes generated by the code generator 101 are quadriphase codes or poly-phase codes, the transmission codes are smoothed since quadriphase or poly-phase codes mapped in the four quadrants of the IQ plane. This can reduce variations in amplitude even if the reception signal's phase changes due to Doppler variations. Accordingly, the π/2 shift modulator 103 may be omitted from the radar transmitter.

(3) In the radar apparatuses 10, 20, 30 (30a), and 40 (40a) illustrated in FIGS. 1 and 7 to 12, the radar transmitters 100, 300, 500 (500a), and 700 (700a) may be individually provided physically apart from the radar receivers 200, 400, 600 (600a), and 800 (800a), respectively.

(4) The radar apparatuses 10, 20, 30 (30a), and 40 (40a) may include a central processing unit (CPU), a storage medium such as a read only storage (ROM) storing control programs, and working memories such as a random access storage, which are not illustrated, for example. In this case, the function of each component is implemented by execution of a control program by the CPU.

Hereinabove, the various types of embodiments are described with reference to the drawings. However, it is obvious that the disclosure is not limited to the aforementioned examples. It is obvious that those skilled in the art can arrive at various modifications and changes within the scope of the matters described in the claims, and it is certainly understood that such changes and modifications are within the technical scope of the disclosure. Moreover, the constituent components of the aforementioned embodiments may be arbitrarily combined without departing from the scope of the disclosure.

In the above description of each embodiment, the disclosure is implemented by hardware by way of example. The disclosure can be implemented by software in cooperation with hardware.

Each functional block used in the description of the above embodiments is typically implemented as an LSI, which is an integrated circuit. The integrated circuit controls each functional block used in the description of the above embodiments and may include input and output terminals. These functional blocks may be implemented as individual chips, or all or some of the functional blocks may be implemented together as a chip. In the above description, LSIs may be replaced with ICs, system LSIs, super LSIs, or ultra-LSIs depending on the degree of integration.

The integration is not limited to the way of using LSIs and may be implemented using a dedicated circuit or a general purpose processor. Alternatively, the integration may be implemented using a field programmable gate array (FPGA) which can be programmed after manufactured as an LSI or a reconfigurable processor in which connections or settings of circuit cells of the LSI are reconfigurable.

Moreover, if another integration technique which can be replaced for LSIs appears by progresses in semiconductor techniques or other derived techniques, it is certain that the functional blocks can be integrated using the integration technique. The likely applications include biological technologies and the like.

SUMMARY OF DISCLOSURE

A radar apparatus of the disclosure is the radar apparatus including: a radar transmitter which transmits a radar signal; and a radar receiver which receives a reflection wave signal being a reflection of the radar signal on a target. The radar transmitter includes: a generator that generates the radar signal composed of a transmission code with each sub-pulse given a predetermined phase shift; and a transmission radio unit that transmits the radar signal generated by the generator, in a predetermined transmission cycle. Here, in radar signals transmitted by the transmission radio unit in a predetermined number of transmission cycles, code imbalances of transmission codes are included in all of four quadrants of an IQ plane, each of the code imbalances being an imbalance between positions where a plurality of sub-pulses constituting a transmission code included in a radar signal transmitted in each of the transmission cycles are mapped on the IQ plane.

In the radar apparatus of the disclosure, the radar transmitter further includes: a detector that detects a code imbalance of each transmission code included in a radar signal transmitted by the transmission radio unit; and a phase shifter that gives, to the transmission code, a first phase shift correcting the code imbalance detected by the detector, and the radar receiver includes an opposite phase shifter that gives a second phase shift to the reflection wave signal, the second phase shift being in a direction opposite to a direction of the first phase shift.

In the radar apparatus of the disclosure, the generator generates at least four of the transmission codes, code imbalances of which are located in different quadrants of the IQ plane, and the transmission radio unit sequentially transmits the at least four transmission codes in each transmission cycle.

The radar apparatus of the disclosure further includes: a plurality of transmitting antennas; and a transmission switch which switches a transmitting antenna transmitting the radar signal among the plurality of transmission antennas at each period corresponding to the predetermined number of transmission cycles.

The radar apparatus of the disclosure further includes: a plurality of transmission antennas; and an orthogonal code generator which generates the same number of orthogonal codes as the number of the transmission antennas, the orthogonal codes being orthogonal to each other, in which the transmission radio unit switches an element to be multiplied by the radar signal among a plurality of elements constituting the orthogonal codes, at each period corresponding to the predetermined number of transmission cycles.

In the radar apparatus of the disclosure, the predetermined number is a multiple of 4.

In the radar apparatus of the disclosure, the transmission codes are complementary codes, and the predetermined number is a multiple of 8.

A radar method of the disclosure is the radar method including: transmitting a radar signal; and receiving a reflection wave signal being a reflection of the radar signal on a target. In the method, a radar signal composed of a transmission code with each sub-pulse given a predetermined phase shift is generated, and the generated radar signal is transmitted in a predetermined transmission cycle, in which code imbalances of transmission codes are included in all of four quadrants of an IQ plane in radar signals transmitted in a predetermined number of transmission cycles, each of the code imbalances being an imbalance between positions where a plurality of sub-pulses constituting a transmission code included in a radar signal transmitted in each of the transmission cycles are mapped on the IQ plane.

The disclosure is applicable to radar apparatuses detecting a wide range of angle.

What is claimed is:
1. A radar apparatus, comprising:
a radar transmitter which transmits a radar signal; and
a radar receiver which receives a reflection wave signal being a reflection of the radar signal on a target, wherein
the radar transmitter includes
a generator that generates the radar signal composed of a transmission code with each sub-pulse given a predetermined phase shift, and
a transmission radio unit that transmits the radar signal generated by the generator, in a predetermined transmission cycle, wherein
in radar signals transmitted by the transmission radio unit in a predetermined number of transmission cycles, code imbalances of transmission codes are included in all of four quadrants of an IQ plane, each of the code imbalances being an imbalance between positions where a plurality of sub-pulses constituting a transmission code included in a radar signal transmitted in each of the transmission cycles are mapped on the IQ plane.
2. The radar apparatus according to claim 1, wherein
the radar transmitter further includes
a detector that detects a code imbalance of each transmission code included in a radar signal transmitted by the transmission radio unit, and
a phase shifter that gives, to the transmission code, a first phase shift correcting the code imbalance detected by the detector, and
the radar receiver includes
an opposite phase shifter that gives a second phase shift to the reflection wave signal, the second phase shift being in a direction opposite to a direction of the first phase shift.
3. The radar apparatus according to claim 1, wherein
the generator generates at least four of the transmission codes, code imbalances of which are located in different quadrants of the IQ plane, and
the transmission radio unit sequentially transmits the at least four transmission codes in each transmission cycle.

4. The radar apparatus according to claim 1, further comprising:
- a plurality of transmitting antennas; and
- a transmission switch which switches a transmitting antenna transmitting the radar signal among the plurality of transmission antennas at each period corresponding to the predetermined number of transmission cycles.

5. The radar apparatus according to claim 1, further comprising:
- a plurality of transmission antennas; and
- an orthogonal code generator which generates the same number of orthogonal codes as the number of the transmission antennas, the orthogonal codes being orthogonal to each other, wherein
- the transmission radio unit switches an element to be multiplied by the radar signal among a plurality of elements constituting the orthogonal codes, at each period corresponding to the predetermined number of transmission cycles.

6. The radar apparatus according to claim 1, wherein the predetermined number is a multiple of 4.

7. The radar apparatus according to claim 1, wherein the transmission codes are complementary codes, and the predetermined number is a multiple of 8.

8. A radar method, comprising:
- transmitting a radar signal; and
- receiving a reflection wave signal being a reflection of the radar signal on a target, wherein
- a radar signal composed of a transmission code with each sub-pulse given a predetermined phase shift is generated, and
- the generated radar signal is transmitted in a predetermined transmission cycle, wherein
- code imbalances of transmission codes are included in all of four quadrants of an IQ plane in radar signals transmitted in a predetermined number of transmission cycles, each of the code imbalances being an imbalance between positions where a plurality of sub-pulses constituting a transmission code included in a radar signal transmitted in each of the transmission cycles are mapped on the IQ plane.

* * * * *